(12) United States Patent
Murakami et al.

(10) Patent No.: US 12,044,795 B2
(45) Date of Patent: Jul. 23, 2024

(54) ELECTRONIC DEVICE, CONTROL METHOD OF ELECTRONIC DEVICE, AND CONTROL PROGRAM OF ELECTRONIC DEVICE

(71) Applicant: KYOCERA Corporation, Kyoto (JP)

(72) Inventors: Youhei Murakami, Yokohama (JP); Tooru Sahara, Yokohama (JP); Masamitsu Nishikido, Yokohama (JP); Takuya Homma, Yokohama (JP); Masayuki Sato, Yokohama (JP); Satoshi Kawaji, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 645 days.

(21) Appl. No.: 17/282,550

(22) PCT Filed: Oct. 7, 2019

(86) PCT No.: PCT/JP2019/039523
§ 371 (c)(1),
(2) Date: Apr. 2, 2021

(87) PCT Pub. No.: WO2020/075682
PCT Pub. Date: Apr. 16, 2020

(65) Prior Publication Data
US 2021/0373124 A1    Dec. 2, 2021

(30) Foreign Application Priority Data

Oct. 12, 2018   (JP) .................................. 2018-193318

(51) Int. Cl.
*G01S 7/41* (2006.01)
*G01S 13/04* (2006.01)
(Continued)

(52) U.S. Cl.
CPC ............... *G01S 7/411* (2013.01); *G01S 13/04* (2013.01); *G01S 13/931* (2013.01); *B60W 40/02* (2013.01);
(Continued)

(58) Field of Classification Search
CPC ......... B60W 2420/52; B60W 2554/80; B60W 40/02; G01S 13/04; G01S 13/343;
(Continued)

(56) References Cited

U.S. PATENT DOCUMENTS

| | | |
|---|---|---|
| 10,725,162 B2 | 7/2020 | Rao |
| 11,131,761 B2 | 9/2021 | Rao |

(Continued)

FOREIGN PATENT DOCUMENTS

| | | |
|---|---|---|
| JP | H11-84001 A | 3/1999 |
| JP | 2002-174677 A | 6/2002 |

(Continued)

OTHER PUBLICATIONS

KR101400125 (Year: 2014).*

*Primary Examiner* — Timothy A Brainard
(74) *Attorney, Agent, or Firm* — Studebaker & Brackett PC

(57) ABSTRACT

An electronic device comprises: a transmission antenna configured to transmit transmission waves; a reception antenna configured to receive reflected waves resulting from reflection of the transmission waves; and a controller. The controller is configured to detect an object reflecting the transmission waves, based on a transmission signal transmitted as the transmission waves and a reception signal received as the reflected waves. The controller is configured to classify a detection result of the object reflecting the transmission waves depending on a degree of certainty, and output the classified detection result.

12 Claims, 11 Drawing Sheets

(51) Int. Cl.
*G01S 13/931* (2020.01)
*B60W 40/02* (2006.01)
*H01Q 1/32* (2006.01)

(52) U.S. Cl.
CPC ... *B60W 2420/408* (2024.01); *B60W 2554/80* (2020.02); *H01Q 1/3233* (2013.01)

(58) Field of Classification Search
CPC .. G01S 13/4454; G01S 13/584; G01S 13/931; G01S 2013/93271; G01S 2013/93272; G01S 7/356; G01S 7/358; G01S 7/411; H01Q 1/3233
See application file for complete search history.

(56) References Cited

U.S. PATENT DOCUMENTS

| | | |
|---|---|---|
| 2014/0203959 A1 | 7/2014 | Kriel et al. |
| 2016/0161597 A1 | 6/2016 | Treptow et al. |
| 2017/0205501 A1* | 7/2017 | Liu .................... G01S 7/414 |
| 2017/0363717 A1 | 12/2017 | Ishimori et al. |
| 2017/0363732 A1 | 12/2017 | Ishimori et al. |
| 2018/0297520 A1* | 10/2018 | Morimura ............ G02B 27/01 |
| 2019/0147331 A1* | 5/2019 | Arditi .................. G01C 21/32 |
| | | 706/20 |

FOREIGN PATENT DOCUMENTS

| | | |
|---|---|---|
| JP | 2006-292518 A | 10/2006 |
| JP | 2007-107912 A | 4/2007 |
| JP | 2008-286582 A | 11/2008 |
| JP | 2017-516116 A | 6/2017 |

* cited by examiner

ELECTRONIC DEVICE, CONTROL METHOD OF ELECTRONIC DEVICE, AND CONTROL PROGRAM OF ELECTRONIC DEVICE

CROSS REFERENCE TO RELATED APPLICATION

This application claims priority to and the benefit of Japanese Patent Application No. 2018-193318 filed on Oct. 12, 2018, the entire disclosure of which is incorporated herein by reference.

TECHNICAL FIELD

The present disclosure relates to an electronic device, a control method of an electronic device, and a control program of an electronic device.

BACKGROUND

In fields such as automobile-related industry, techniques of measuring, for example, the distance between a vehicle and a certain object are considered important. In particular, various techniques of radar (radio detecting and ranging) that measures, for example, the distance from an object such as an obstacle by transmitting radio waves such as millimeter waves and receiving reflected waves reflected off the object are studied in recent years. The importance of such techniques of measuring distance and the like is expected to further increase in the future, with the development of techniques of assisting the driver in driving and techniques related to automated driving whereby driving is wholly or partly automated.

There are also various proposals for techniques of detecting the presence of a certain object by receiving reflected waves resulting from reflection of transmitted radio waves off the object. For example, JP H11-84001 A (PTL 1) discloses an on-vehicle radar device that detects the degree of certainty (degree of probability (likelihood)) of information relating to a reflector.

CITATION LIST

Patent Literature

PTL 1: JP H11-84001 A

SUMMARY

An electronic device according to an embodiment comprises: a transmission antenna configured to transmit transmission waves; a reception antenna configured to receive reflected waves resulting from reflection of the transmission waves; and a controller. The controller is configured to detect an object reflecting the transmission waves, based on a transmission signal transmitted as the transmission waves and a reception signal received as the reflected waves. The controller is configured to classify a detection result of the object reflecting the transmission waves depending on a degree of certainty, and output the classified detection result.

A control method of an electronic device according to an embodiment comprises: (1) transmitting transmission waves from a transmission antenna; (2) receiving reflected waves resulting from reflection of the transmission waves, by a plurality of reception antennas; (3) detecting an object reflecting the transmission waves, based on a transmission signal transmitted as the transmission waves and a reception signal received as the reflected waves; and (4) classifying a detection result of the object reflecting the transmission waves depending on a degree of certainty, and outputting the classified detection result.

A control program of an electronic device according to an embodiment causes a computer to execute the foregoing (1) to (4).

DETAILED DESCRIPTION

It is desirable to improve convenience in techniques of detecting an object by receiving reflected waves resulting from reflection of transmitted transmission waves off the object. It could therefore be helpful to provide an electronic device, a control method of an electronic device, and a control program of an electronic device that can improve convenience in object detection. According to an embodiment, it is possible to provide an electronic device, a control method of an electronic device, and a control program of an electronic device that can improve convenience in object detection. One of the disclosed embodiments will be described in detail below, with reference to the drawings.

An electronic device according to an embodiment can be mounted in a vehicle (mobile body) such as a car (automobile) to detect a certain object around the mobile body. The electronic device according to the embodiment can transmit transmission waves to the surroundings of the mobile body from a transmission antenna installed in the mobile body. The electronic device according to the embodiment can also receive reflected waves resulting from reflection of the transmission waves, by a reception antenna installed in the mobile body. At least one of the transmission antenna and the reception antenna may be included in, for example, a radar sensor installed in the mobile body.

The following will describe a structure in which the electronic device according to the embodiment is mounted in a car such as a passenger car, as a typical example. The electronic device according to the embodiment is, however, not limited to being mounted in a car. The electronic device according to the embodiment may be mounted in various mobile bodies such as a bus, a truck, a motorcycle, a bicycle, a ship, an airplane, an ambulance, a fire engine, a helicopter, and a drone. The electronic device according to the embodiment is not limited to being mounted in a mobile body that moves with its own power. For example, the mobile body in which the electronic device according to the embodiment is mounted may be a trailer portion towed by a tractor. The electronic device according to the embodiment can measure, for example, the distance between the sensor and the object in a situation in which at least one of the sensor and the object can move. The electronic device according to the embodiment can also measure, for example, the distance between the sensor and the object when both the sensor and the object are stationary.

An example of object detection by the electronic device according to the embodiment will be described below.

Figure 1:
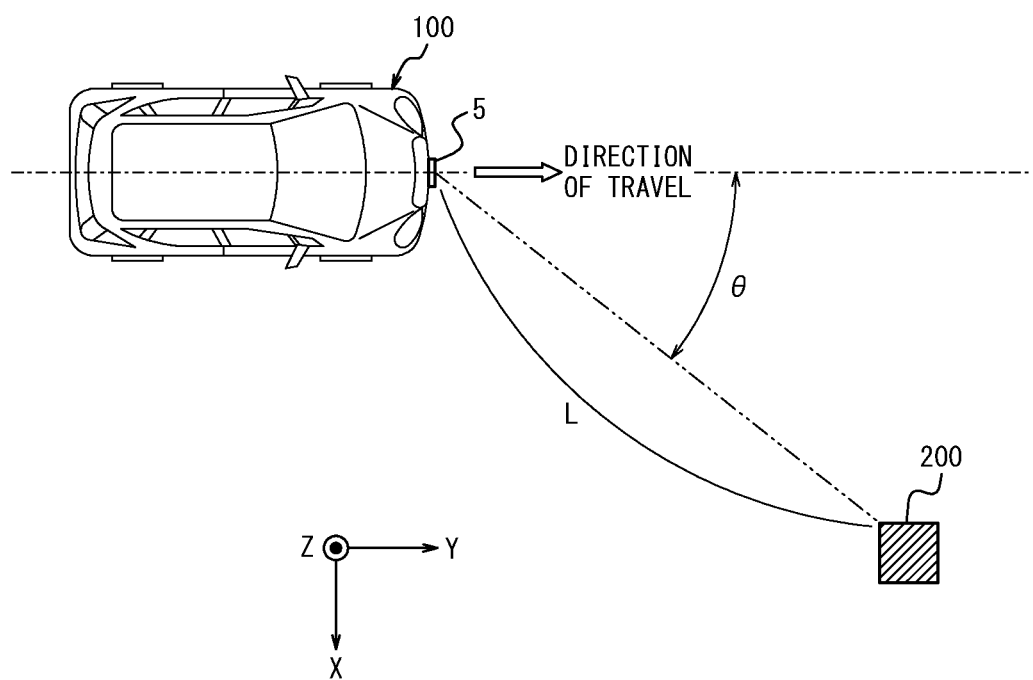
FIG. 1 is a diagram illustrating a use state of an electronic device according to an embodiment.

FIG. 1 is a diagram illustrating a use state of the electronic device according to the embodiment. FIG. 1 illustrates an example in which a sensor including a transmission antenna and a reception antenna according to the embodiment is installed in a mobile body.

A sensor 5 including a transmission antenna and a reception antenna according to the embodiment is installed in a mobile body 100 illustrated in FIG. 1. An electronic device 1 according to the embodiment is mounted (e.g. included) in the mobile body 100 illustrated in FIG. 1. A specific structure of the electronic device 1 will be described later. For example, the sensor 5 may include at least one of the transmission antenna and the reception antenna. The sensor 5 may include at least one of the other functional parts, such as at least part of a controller 10 (FIG. 2) included in the electronic device 1, as appropriate. The mobile body 100 illustrated in FIG. 1 may be a vehicle of a car such as a passenger car. The mobile body 100 illustrated in FIG. 1 may be any type of mobile body. In FIG. 1, for example, the mobile body 100 may move (run or slow down) in the Y-axis positive direction (direction of travel) in the drawing, move in other directions, or be stationary without moving.

As illustrated in FIG. 1, the sensor 5 including a transmission antenna is installed in the mobile body 100. In the example illustrated in FIG. 1, only one sensor 5 including a transmission antenna and a reception antenna is installed at the front of the mobile body 100. The position at which the sensor 5 is installed in the mobile body 100 is not limited to the position illustrated in FIG. 1, and may be any other position as appropriate. For example, the sensor 5 illustrated in FIG. 1 may be installed at the left, the right, and/or the back of the mobile body 100. The number of sensors 5 may be any number greater than or equal to 1, depending on various conditions (or requirements) such as the range and/or accuracy of measurement in the mobile body 100.

The sensor 5 transmits electromagnetic waves from the transmission antenna as transmission waves. For example, in the case where there is a certain object (e.g. an object 200 illustrated in FIG. 1) around the mobile body 100, at least part of the transmission waves transmitted from the sensor 5 is reflected off the object to become reflected waves. As a result of the reflected waves being received by, for example, the reception antenna of the sensor 5, the electronic device 1 mounted in the mobile body 100 can detect the object.

The sensor 5 including the transmission antenna may be typically a radar (radio detecting and ranging) sensor that transmits and receives radio waves. The sensor 5 is, however, not limited to a radar sensor. For example, the sensor 5 according to the embodiment may be a sensor based on a technique of lidar (light detection and ranging, laser imaging detection and ranging) by lightwaves. Such sensors may include, for example, patch antennas and the like. Since the techniques of radar and lidar are already known, detailed description is simplified or omitted as appropriate.

The electronic device 1 mounted in the mobile body 100 illustrated in FIG. 1 receives reflected waves of transmission waves transmitted from the transmission antenna in the sensor 5, by the reception antenna. Thus, the electronic device 1 can detect the object 200 present within a predetermined distance from the mobile body 100. For example, the electronic device 1 can measure the distance L between the mobile body 100 as the own vehicle and the object 200, as illustrated in FIG. 1. The electronic device 1 can also measure the relative speed of the mobile body 100 as the own vehicle and the object 200. The electronic device 1 can further measure the direction (arrival angle θ) in which the reflected waves from the object 200 reaches the mobile body 100 as the own vehicle.

The object 200 may be, for example, at least one of an oncoming car running in a lane adjacent to the mobile body 100, a car running parallel to the mobile body 100, and a car running ahead or behind in the same lane as the mobile body 100. The object 200 may be any object around the mobile body 100, such as a motorcycle, a bicycle, a stroller, a pedestrian, a guardrail, a median strip, a road sign, a manhole, a slope, a sidewalk step, a wall, and an obstacle. The object 200 may be moving or stopped. For example, the object 200 may be a car parked or stopped around the mobile body 100. The object 200 is not limited to being on a roadway, and may be in any appropriate location such as a sidewalk, a farm, farmland, a parking lot, a vacant lot, a space on a road, inside a store, a pedestrian crossing, on water, in the air, a gutter, a river, inside another mobile body, a building, or inside or outside of any other structure. In the present disclosure, examples of the object 200 detected by the sensor 5 include not only non-living objects but also living objects such as humans, dogs, cats, horses, and other animals. In the present disclosure, the object 200 detected by the sensor 5 includes a target such as a human, a thing, or an animal detected by radar technology.

In FIG. 1, the ratio between the size of the sensor 5 and the size of the mobile body 100 does not necessarily represent the actual ratio. In FIG. 1, the sensor 5 is installed on the outside of the mobile body 100. However, in an embodiment, the sensor 5 may be installed at any of various locations in the mobile body 100. For example, in an embodiment, the sensor 5 may be installed inside the bumper of the mobile body 100 so as not to be seen from outside. The sensor 5 may be installed inside the mobile body 100, such as a space inside a bumper, a space inside a headlight, or a driving space.

It is assumed here that the transmission antenna in the sensor 5 transmits radio waves in a frequency band such as millimeter waves (30 GHz or more) or submillimeter waves (e.g. about 20 GHz to 30 GHz), as a typical example. For example, the transmission antenna in the sensor 5 may transmit radio waves with a frequency bandwidth of 4 GHz, e.g. 77 GHz to 81 GHz.

Figure 2:
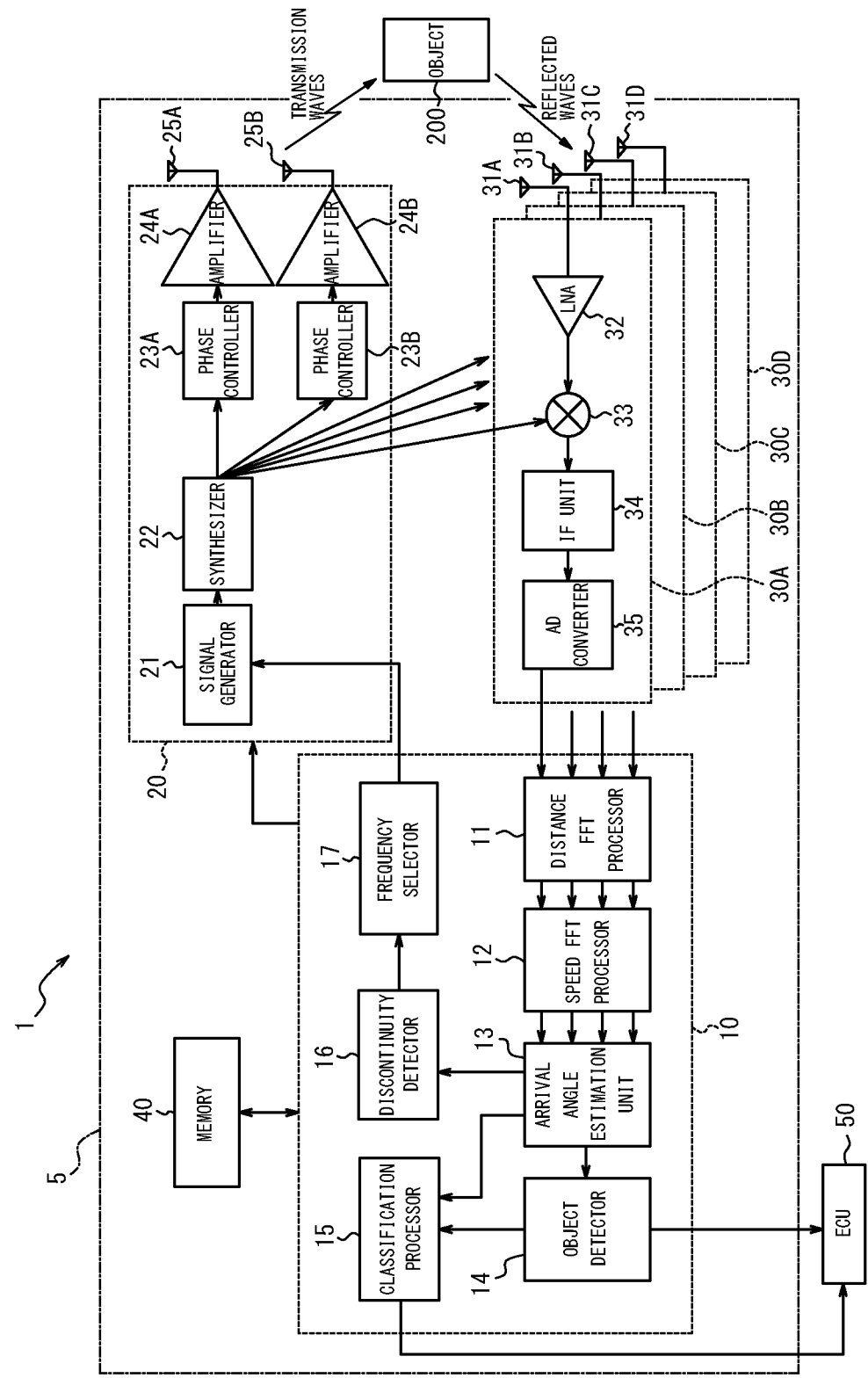
FIG. 2 is a functional block diagram schematically illustrating a structure of the electronic device according to the embodiment.

FIG. 2 is a functional block diagram schematically illustrating an example of the structure of the electronic device 1 according to the embodiment. The example of the structure of the electronic device 1 according to the embodiment will be described below.

When measuring distance or the like by millimeter wave radar, frequency-modulated continuous wave radar (hereafter, "FMCW radar") is often used. FMCW radar sweeps the frequency of transmitted radio waves to generate a transmission signal. Therefore, for example, in millimeter-wave FMCW radar using radio waves in a frequency band of 79 GHz, the radio waves used have a frequency bandwidth of 4 GHz, e.g. 77 GHz to 81 GHz. Radar of 79 GHz in frequency band has a feature that its usable frequency bandwidth is broader than that of other millimeter wave/submillimeter wave radar of 24 GHz, 60 GHz, 76 GHz, etc. in frequency band. This embodiment will be described below.

The electronic device 1 according to the embodiment includes the sensor 5 and an electronic control unit (ECU) 50, as illustrated in FIG. 2. The ECU 50 controls various operations of the mobile body 100. The ECU 50 may be composed of one or more ECUs. The electronic device 1 according to the embodiment includes the controller 10. The electronic device 1 according to the embodiment may include other functional parts as appropriate, such as at least one of a transmitter 20, receivers 30A to 30D, and a memory 40. The electronic device 1 may include a plurality of receivers such as the receivers 30A to 30D, as illustrated in FIG. 2. Hereafter, in the case where the receivers 30A to 30D are not distinguished from one another, they are simply referred to as "receiver 30".

The controller 10 includes a distance FFT processor 11, a speed FFT processor 12, an arrival angle estimation unit 13, an object detector 14, a classification processor 15, a discontinuity detector 16, and a frequency selector 17. These functional parts included in the controller 10 will be described in detail later.

The transmitter 20 may include a signal generator 21, a synthesizer 22, phase controllers 23A and 23B, amplifiers 24A and 24B, and transmission antennas 25A and 25B, as illustrated in FIG. 2. Hereafter, in the case where the phase controllers 23A and 23B are not distinguished from each other, they are simply referred to as "phase controller 23". In the case where the amplifiers 24A and 24B are not distinguished from each other, they are simply referred to as "amplifier 24". In the case where the transmission antennas 25A and 25B are not distinguished from each other, they are simply referred to as "transmission antenna 25".

The respective receivers 30 may include corresponding reception antennas 31A to 31D, as illustrated in FIG. 2. Hereafter, in the case where the reception antennas 31A to 31D are not distinguished from one another, they are simply referred to as "reception antenna 31". The plurality of receivers 30 may each include a LNA 32, a mixer 33, an IF unit 34, and an AD converter 35, as illustrated in FIG. 2. The receivers 30A to 30D may have the same structure. FIG. 2 schematically illustrates only the structure of the receiver 30A as a typical example.

The sensor 5 may include, for example, the transmission antennas 25 and the reception antennas 31. The sensor 5 may include at least one of the other functional parts such as the controller 10, as appropriate.

The controller 10 included in the electronic device 1 according to the embodiment controls overall operation of the electronic device 1, including control of each of the functional parts included in the electronic device 1. The controller 10 may include at least one processor such as a central processing unit (CPU), to provide control and processing capacity for achieving various functions. The controller 10 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the controller 10 may be implemented, for example, by a CPU and a program executed by the CPU. The controller 10 may include a memory necessary for the operation of the controller 10.

The memory 40 may store the program executed by the controller 10, results of processes performed by the controller 10, and the like. The memory 40 may function as a work memory of the controller 10. The memory 40 may be implemented, for example, by a semiconductor memory, a magnetic disk, or the like. The memory 40 is, however, not limited to such, and may be any storage device. For example, the memory 40 may be a storage medium such as a memory card inserted in the electronic device 1 according to the embodiment. The memory 40 may be an internal memory of the CPU used as the controller 10 as described above.

In an embodiment, the memory 40 may store various parameters for setting the range of object detection by the transmission waves T transmitted by the transmission antenna 25 and the reflected waves R received by the reception antenna 31. Such parameters will be described in detail later.

In the electronic device 1 according to the embodiment, the controller 10 can control at least one of the transmitter 20 and the receiver 30. In this case, the controller 10 may control at least one of the transmitter 20 and the receiver 30 based on various information stored in the memory 40. In the electronic device 1 according to the embodiment, the controller 10 may instruct the signal generator 21 to generate a signal, or control the signal generator 21 to generate a signal.

The signal generator 21 generates a signal (transmission signal) transmitted from the transmission antenna 25 as the transmission waves T, based on control by the controller 10. When generating the transmission signal, for example, the signal generator 21 may assign the frequency of the transmission signal based on control by the controller 10. Specifically, the signal generator 21 may generate a transmission signal of a frequency selected by the frequency selector 17. For example, the signal generator 21 receives frequency information from the controller 10 (the frequency selector 17), and generates a signal of a predetermined frequency in a frequency band of 77 GHz to 81 GHz. The signal generator 21 may include a functional part such as a voltage controlled oscillator (VCO).

The signal generator 21 may be configured as hardware having the function, configured as a microcomputer or the like, or configured as a processor such as a CPU and a program executed by the processor. Each functional part described below may be configured as hardware having the function, or, if possible, configured as a microcomputer or the like or configured as a processor such as a CPU, a program executed by the processor, and the like.

In the electronic device 1 according to the embodiment, the signal generator 21 may generate a transmission signal (transmission chirp signal) such as a chirp signal. In particular, the signal generator 21 may generate a signal (linear chirp signal) whose frequency linearly changes periodically. For example, the signal generator 21 may generate a chirp signal whose frequency linearly increases periodically from 77 GHz to 81 GHz with time. For example, the signal generator 21 may generate a signal whose frequency periodically repeats a linear increase (up-chirp) and decrease (down-chirp) from 77 GHz to 81 GHz with time. The signal generated by the signal generator 21 may be, for example, set by the controller 10 beforehand. The signal generated by the signal generator 21 may be, for example, stored in the memory 40 or the like beforehand. Since chirp signals used in technical fields such as radar are already known, more detailed description is simplified or omitted as appropriate. The signal generated by the signal generator 21 is supplied to the synthesizer 22.

Figure 3:
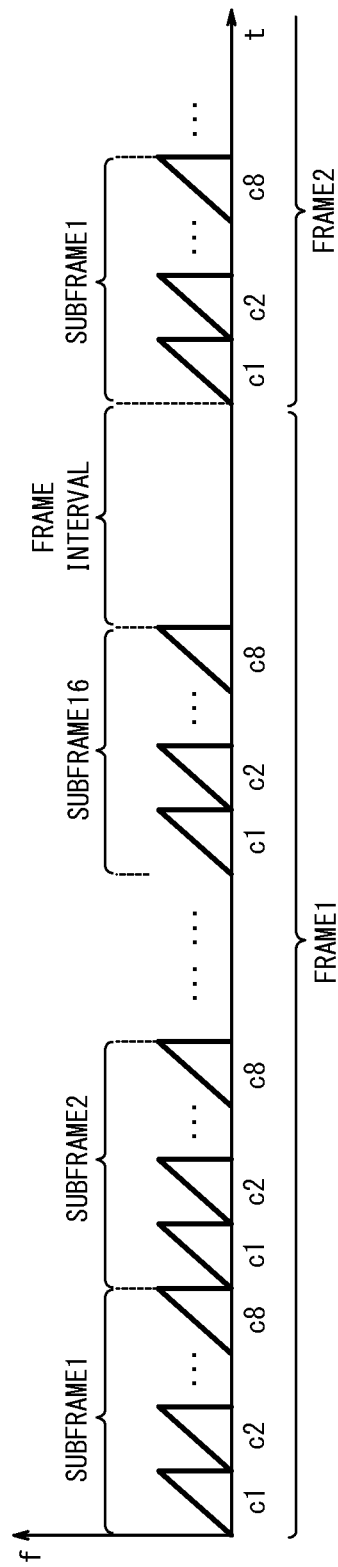
FIG. 3 is a diagram illustrating a structure of a transmission signal according to the embodiment.

FIG. 3 is a diagram illustrating an example of a chirp signal generated by the signal generator 21.

In FIG. 3, the horizontal axis represents elapsed time, and the vertical axis represents frequency. In the example illustrated in FIG. 3, the signal generator 21 generates a linear chirp signal whose frequency linearly changes periodically. In FIG. 3, chirp signals are designated as c1, c2, ..., c8. In each chirp signal, the frequency increases linearly with time, as illustrated in FIG. 3.

In the example illustrated in FIG. 3, eight chirp signals, e.g. c1, c2, ..., c8, are included in one subframe. That is, each of subframes 1, 2, etc. illustrated in FIG. 3 is composed of eight chirp signals c1, c2, ..., c8. In the example illustrated in FIG. 3, 16 subframes, e.g. subframes 1 to 16, are included in one frame. That is, each of frames 1, 2, etc. illustrated in FIG. 3 is composed of 16 subframes. Predetermined frame intervals may be provided between the frames, as illustrated in FIG. 3.

In FIG. 3, each subsequent frame from the frame 2 may have the same structure. In FIG. 3, each subsequent frame from the frame 3 may have the same structure. In the electronic device 1 according to the embodiment, the signal generator 21 may generate a transmission signal of any number of frames. In FIG. 3, some chirp signals are omitted. The relationship between the time and the frequency of the transmission signal generated by the signal generator 21 may be stored, for example, in the memory 40.

Thus, the electronic device 1 according to the embodiment may transmit a transmission signal composed of subframes each of which includes a plurality of chirp signals. The electronic device 1 according to the embodiment may transmit a transmission signal composed of frames each of which includes a predetermined number of subframes.

In the following description, it is assumed that the electronic device 1 transmits a transmission signal of the frame structure illustrated in FIG. 3. The frame structure illustrated in FIG. 3 is, however, an example. For example, the number of chirp signals included in one subframe is not limited to 8. In an embodiment, the signal generator 21 may generate a subframe including any number (e.g. a plurality) of chirp signals. The subframe structure illustrated in FIG. 3 is also an example. For example, the number of subframes included in one frame is not limited to 16. In an embodiment, the signal generator 21 may generate a frame including any number (e.g. a plurality) of subframes.

Referring back to FIG. 2, the synthesizer 22 increases the frequency of the signal generated by the signal generator 21 to a frequency in a predetermined frequency band. The synthesizer 22 may increase the frequency of the signal generated by the signal generator 21 to a frequency selected as the frequency of the transmission waves T transmitted from the transmission antenna 25. The frequency selected as the frequency of the transmission waves T transmitted from the transmission antenna 25 may be, for example, set by the controller 10. For example, the frequency selected as the frequency of the transmission waves T transmitted from the transmission antenna 25 may be the frequency selected by the frequency selector 17. The frequency selected as the frequency of the transmission waves T transmitted from the transmission antenna 25 may be, for example, stored in the memory 40. The signal increased in frequency by the synthesizer 22 is supplied to the phase controller 23 and the mixer 33. In the case where there are a plurality of phase controllers 23, the signal increased in frequency by the synthesizer 22 may be supplied to each of the plurality of phase controllers 23. In the case where there are a plurality of receivers 30, the signal increased in frequency by the synthesizer 22 may be supplied to the mixer 33 in each of the plurality of receivers 30.

The phase controller 23 controls the phase of the transmission signal supplied from the synthesizer 22. Specifically, the phase controller 23 may, for example, adjust the phase of the transmission signal by advancing or delaying the phase of the signal supplied from the synthesizer 22 as appropriate, based on control by the controller 10. In this case, based on the path difference between the transmission waves T transmitted from the plurality of transmission antennas 25, the phase controllers 23 may adjust the phases of the respective transmission signals. As a result of the phase controllers 23 adjusting the phases of the respective transmission signals as appropriate, the transmission waves T transmitted from the plurality of transmission antennas 25 intensify each other and form a beam in a predetermined direction (i.e. beamforming). In this case, the correlation between the beamforming direction and the amount of phase to be controlled in the transmission signal transmitted from each of the plurality of transmission antennas 25 may be stored in, for example, the memory 40. The transmission signal phase-controlled by the phase controller 23 is supplied to the amplifier 24.

The amplifier 24 amplifies the power of the transmission signal supplied from the phase controller 23, for example based on control by the controller 10. In the case where the sensor 5 includes a plurality of transmission antennas 25, a plurality of amplifiers 24 may each amplify the power of the transmission signal supplied from a corresponding one of the plurality of phase controllers 23, for example based on control by the controller 10. The technique of amplifying the power of the transmission signal is known, and therefore its more detailed description is omitted. The amplifier 24 is connected to the transmission antenna 25.

The transmission antenna 25 outputs (transmits) the transmission signal amplified by the amplifier 24, as the transmission waves T. In the case where the sensor 5 includes a plurality of transmission antennas 25, each of the plurality of transmission antennas 25 may output (transmit) the transmission signal amplified by a corresponding one of the plurality of amplifiers 24, as the transmission waves T. Since the transmission antenna 25 can be configured in the same way as transmission antennas used in known radar techniques, more detailed description is omitted.

Thus, the electronic device 1 according to the embodiment includes the transmission antenna 25, and can transmit the transmission signal (e.g. transmission chirp signal) from the transmission antenna 25 as the transmission waves T. At least one of the functional parts included in the electronic device 1 may be contained in one housing. The housing may have a structure that cannot be opened easily. For example, the transmission antenna 25, the reception antenna 31, and the amplifier 24 may be contained in one housing having a structure that cannot be opened easily. In the case where the sensor 5 is installed in the mobile body 100 such as a car, the transmission antenna 25 may transmit the transmission waves T to outside the mobile body 100 through a cover member such as a radar cover. In this case, the radar cover may be made of a material that allows electromagnetic waves to pass through, such as synthetic resin or rubber. For example, the radar cover may be a housing of the sensor 5. By covering the transmission antenna 25 with a member such as a radar cover, the risk that the transmission antenna 25 breaks or becomes defective due to external contact can be reduced. The radar cover and the housing are also referred to as "radome".

In the example illustrated in FIG. 2, the electronic device 1 includes two transmission antennas 25. In an embodiment, however, the electronic device 1 may include any number of transmission antennas 25. In an embodiment, the electronic device 1 may include a plurality of transmission antennas 25 in the case of forming, in a predetermined direction, a beam of the transmission waves T transmitted from the transmission antennas 25. In an embodiment, the electronic device 1 may include any number of transmission antennas 25, where the number is 2 or more. In this case, the electronic device 1 may include a plurality of phase controllers 23 and a plurality of amplifiers 24 corresponding to the plurality of transmission antennas 25. The plurality of phase controllers 23 may control the phases of the plurality of transmission waves supplied from the synthesizer 22 and transmitted from the respective plurality of transmission antennas 25. The plurality of amplifiers 24 may amplify the powers of the plurality of transmission signals transmitted from the respective plurality of transmission antennas 25. In this case, the sensor 5 may include the plurality of transmission antennas. Thus, in the case where the electronic device 1 illustrated in FIG. 2 includes the plurality of transmission antennas 25, the electronic device 1 may equally include the pluralities of functional parts necessary for transmitting the transmission waves T from the plurality of transmission antennas 25.

The reception antenna 31 receives reflected waves R. The reflected waves R result from reflection of the transmission waves T off the object 200. The reception antenna 31 may include a plurality of antennas such as the reception antennas 31A to 31D. Since the reception antenna 31 can be configured in the same way as reception antennas used in known radar techniques, more detailed description is omitted. The reception antenna 31 is connected to the LNA 32. A reception signal based on the reflected waves R received by the reception antenna 31 is supplied to the LNA 32.

The electronic device 1 according to the embodiment can receive the reflected waves R as a result of the transmission waves T transmitted as the transmission signal such as a chirp signal (transmission chirp signal) being reflected off the object 200, by the plurality of reception antennas 31. In the case where the transmission chirp signal is transmitted as the transmission waves T, the reception signal based on the received reflected waves R is referred to as "reception chirp signal". That is, the electronic device 1 receives the reception signal (e.g. reception chirp signal) by the reception antenna 31 as the reflected waves R. In the case where the sensor 5 is installed in the mobile body 100 such as a car, the reception antenna 31 may receive the reflected waves R from outside the mobile body 100 through a cover member such as a radar cover. In this case, the radar cover may be made of a material that allows electromagnetic waves to pass through, such as synthetic resin or rubber. For example, the radar cover may be a housing of the sensor 5. By covering the reception antenna 31 with a member such as a radar cover, the risk that the reception antenna 31 breaks or becomes defective due to external contact can be reduced. The radar cover and the housing are also referred to as "radome".

In the case where the reception antenna 31 is installed near the transmission antenna 25, these antennas may be included in one sensor 5 in combination. For example, one sensor 5 may include at least one transmission antenna 25 and at least one reception antenna 31. For example, one sensor 5 may include a plurality of transmission antennas 25 and a plurality of reception antennas 31. In such a case, for example, one radar sensor may be covered with one cover member such as a radar cover.

The LNA 32 amplifies the reception signal based on the reflected waves R received by the reception antenna 31, with low noise. The LNA 32 may be a low-noise amplifier, and amplifies the reception signal supplied from the reception antenna 31 with low noise. The reception signal amplified by the LNA 32 is supplied to the mixer 33.

The mixer 33 mixes (multiplies) the reception signal of RF frequency supplied from the LNA 32 and the transmission signal supplied from the synthesizer 22, to generate a beat signal. The beat signal generated by the mixer 33 is supplied to the IF unit 34.

The IF unit 34 performs frequency conversion on the beat signal supplied from the mixer 33, to lower the frequency of the beat signal to intermediate frequency (IF). The beat signal lowered in frequency by the IF unit 34 is supplied to the AD converter 35.

The AD converter 35 digitizes the analog beat signal supplied from the IF unit 34. The AD converter 35 may include any analog-to-digital converter (ADC). The beat signal digitized by the AD converter 35 is supplied to the distance FFT processor 11 in the controller 10. In the case where there are the plurality of receivers 30, the respective beat signals digitized by the plurality of AD converters 35 may be supplied to the distance FFT processor 11.

The distance FFT processor 11 estimates the distance between the mobile body 100 having the electronic device 1 mounted therein and the object 200, based on the beat signal supplied from the AD converter 35. The distance FFT processor 11 may include, for example, a processor that performs a fast Fourier transform (FFT). In this case, the distance FFT processor 11 may be composed of any circuit, chip, or the like for performing FFT processing.

The distance FFT processor 11 performs FFT processing (hereafter also referred to as "distance FFT processing") on the beat signal digitized by the AD converter 35. For example, the distance FFT processor 11 may perform FFT processing on the complex signal supplied from the AD converter 35. The beat signal digitized by the AD converter 35 can be expressed as the temporal change of the signal intensity (power). As a result of the distance FFT processor 11 performing FFT processing on such a beat signal, the signal intensity (power) corresponding to each frequency can be expressed. In the case where the peak of the result obtained by the distance FFT processing is greater than or equal to a predetermined threshold, the distance FFT processor 11 may determine that the object 200 is present at a distance corresponding to the peak. For example, there is a known method that, upon detecting a peak value greater than or equal to a threshold from an average power or amplitude of a disturbance signal, determines that there is an object (reflecting object) reflecting transmission waves, as in constant false alarm rate (CFAR) detection.

Thus, the electronic device 1 according to the embodiment can detect the object 200 reflecting the transmission waves T, based on the transmission signal transmitted as the transmission waves T and the reception signal received as the reflected waves R.

The distance FFT processor 11 can estimate the distance from the object based on one chirp signal (e.g. c1 in FIG. 3). That is, the electronic device 1 can measure (estimate) the distance L illustrated in FIG. 1, by performing distance FFT processing. Since the technique of measuring (estimating) the distance from a certain object by performing FFT processing on a beat signal is well known, more detailed description is simplified or omitted as appropriate. The result (e.g. distance information) of performing distance FFT processing by the distance FFT processor 11 may be supplied to the speed FFT processor 12. The result of performing distance FFT processing by the distance FFT processor 11 may be also supplied to the object detector 14.

The speed FFT processor 12 estimates the relative speed of the mobile body 100 having the electronic device 1 mounted therein and the object 200, based on the beat signal subjected to distance FFT processing by the distance FFT processor 11. The speed FFT processor 12 may include, for example, a processor that performs a fast Fourier transform (FFT). In this case, the speed FFT processor 12 may be composed of any circuit, chip, or the like for performing FFT processing.

The speed FFT processor 12 performs FFT processing (hereafter also referred to as "speed FFT processing") on the beat signal subjected to distance FFT processing by the distance FFT processor 11. For example, the speed FFT processor 12 may perform FFT processing on the complex signal supplied from the distance FFT processor 11. The speed FFT processor 12 can estimate the relative speed with respect to the object, based on a subframe of chirp signals (e.g. subframe 1 in FIG. 3). As a result of performing distance FFT processing on the beat signal as mentioned above, a plurality of vectors can be generated. By finding the phase of a peak in the result of subjecting the plurality of vectors to speed FFT processing, the relative speed with respect to the object can be estimated. That is, the electronic device 1 can measure (estimate) the relative speed of the mobile body 100 and the object 200 illustrated in FIG. 1, by performing speed FFT processing. Since the technique of measuring (estimating) the relative speed with respect to a certain object by performing speed FFT processing on a result of distance FFT processing is well known, more detailed description is simplified or omitted as appropriate. The result (e.g. speed information) of performing speed FFT processing by the speed FFT processor 12 may be supplied to the arrival angle estimation unit 13. The result of performing speed FFT processing by the speed FFT processor 12 may be also supplied to the object detector 14.

The arrival angle estimation unit 13 estimates the direction in which the reflected waves R reach from the object 200, based on the result of speed FFT processing by the speed FFT processor 12. The electronic device 1 can estimate the direction (arrival angle) in which the reflected waves R reach, by receiving the reflected waves R from the plurality of reception antennas 31. For example, suppose the plurality of reception antennas 31 are arranged at predetermined intervals. The transmission waves T transmitted from the transmission antenna 25 are reflected off the object 200 to become the reflected waves R, which are received by each of the plurality of reception antennas 31 arranged at the predetermined intervals. Based on the phase of the reflected waves R received by each of the plurality of reception antennas 31 and the path difference between the reflected waves R of the plurality of reception antennas 31, the arrival angle estimation unit 13 can estimate the direction in which the reflected waves R reach the reception antennas 31. That is, the electronic device 1 can measure (estimate) the arrival angle θ illustrated in FIG. 1, based on the result of speed FFT processing.

There are various proposed techniques of estimating the direction in which the reflected waves R reach based on the result of speed FFT processing Examples of known arrival direction estimation algorithms include multiple signal classification (MUSIC) and estimation of signal parameters via rotational invariance technique (ESPRIT). Detailed description of such known techniques is simplified or omitted as appropriate. Information (angle information) of the arrival angle θ estimated by the arrival angle estimation unit 13 may be supplied to at least one of the object detector 14, the classification processor 15, and the discontinuity detector 16.

The object detector 14 detects an object present in the range in which the transmission waves T are transmitted, based on the information supplied from at least one of the distance FFT processor 11, the speed FFT processor 12, and the arrival angle estimation unit 13. For example, the object detector 14 may detect the object by performing clustering processing based on the supplied distance information, speed information, and angle information. As an algorithm used when clustering data, for example, density-based spatial clustering of applications with noise (DBSCAN) is known. In clustering processing, for example, the average power of points constituting the detected object may be calculated. The distance information, speed information, angle information, and power information of the object detected by the object detector 14 may be supplied to the classification processor 15. The distance information, speed information, angle information, and power information of the object detected by the object detector 14 may be supplied to the ECU 50. In the case where the mobile body 100 is a car, the communication may be performed using a communication interface such as CAN (Controller Area Network).

The classification processor 15 classifies the detection result of the object reflecting the transmission waves T depending on the degree of certainty, and outputs the classified detection result. Here, the classification processor 15 may output information (hereafter also referred to as "classification information") obtained by classifying the detection result of the object reflecting the transmission waves T in stages depending on the degree of certainty of the detection. The classification information will be described in detail later. The classification processor 15 may, for example, classify the detection result of the object reflecting the transmission waves T depending on the degree of certainty based on at least one of information of the estimation by the arrival angle estimation unit 13 and information of the detection result by the object detector 14, and output it.

The classification processor 15 may determine whether the object reflecting the transmission waves T is detected, based on the intensity of the reflected waves R resulting from reflection of the transmission waves T off the object. In more detail, in the case where the intensity of the reflected waves R resulting from reflection of the transmission waves T off the object is greater than or equal to a predetermined value, the classification processor 15 may classify the detection result as a detection result that the object reflecting the transmission waves T is detected. In the case where the intensity of the reflected waves R resulting from reflection of the transmission waves T off the object is less than the predetermined intensity, the classification processor 15 may classify the detection result as a detection result that the object reflecting the transmission waves T is not detected.

In the case where the incidence angle when receiving the reflected waves R is possibly wrongly estimated by the arrival angle estimation unit 13, the classification processor 15 may classify the detection result as a detection result that the object reflecting the transmission waves T is detected but the incidence angle is unable to be determined. Herein, the incidence angle may be the angle between a straight line corresponding to the direction in which the reflected waves R are incident on the reception antennas 31 and a perpendicular line to the direction in which the plurality of reception antennas 31 are arranged.

Information of the result of classification by the classification processor 15 may be supplied to, for example, the ECU 50 and the like. The ECU 50 can use the information of the result of classification by the classification processor 15 for driving assistance for the driver, automatic driving, and the like. In the case where the electronic device 1 is connected to a display that displays information to, for example, the driver of the mobile body 100, the information of the result of classification by the classification processor 15 may be supplied to the display.

The discontinuity detector 16 determines whether the arrival angle estimated by the arrival angle estimation unit 13, i.e. the incidence angle when receiving the reflected waves R, is possibly wrongly estimated. In particular, the discontinuity detector 16 may determine whether the arrival angle estimated by the arrival angle estimation unit 13, i.e. the incidence angle when receiving the reflected waves R, is possibly estimated in an inverted state.

The discontinuity detector 16 may determine whether the incidence angle when receiving the reflected waves R is possibly wrongly estimated, based on the result of estimating the arrival angle by the arrival angle estimation unit 13. In the case where the incidence angle estimated by the arrival angle estimation unit 13 is greater than or equal to a predetermined angle, e.g. 80°, the discontinuity detector 16 may determine that the incidence angle when receiving the reflected waves R is possibly wrongly estimated.

Moreover, for example based on the information estimated by the arrival angle estimation unit 13, the discontinuity detector 16 may determine that the incidence angle when receiving the reflected waves R is possibly wrongly estimated in the case where information representing the detected object does not continuously change with time. Information of the result of determination by the discontinuity detector 16 may be supplied to the frequency selector 17.

The frequency selector 17 selects the frequency of the transmission waves T transmitted from the transmission antenna 25 as a transmission signal such as a chirp signal generated by the signal generator 21. The frequency selector 17 may select the frequency of the transmission waves T based on, for example, information stored in the memory 40.

The frequency selector 17 may also correct (e.g. change) the frequency of the transmission waves T, based on the information of the result of determination by the discontinuity detector 16. In particular, in the case where the discontinuity detector 16 determines that the incidence angle when receiving the reflected waves R is possibly wrongly estimated, the frequency selector 17 may correct the frequency of the transmission waves T. For example, in the case where the discontinuity detector 16 determines that the incidence angle when receiving the reflected waves R is possibly wrongly estimated, the frequency selector 17 may change the frequency of the transmission waves T to be less than or equal to a predetermined frequency in a predetermined frequency band.

The ECU 50 included in the electronic device 1 according to the embodiment controls overall operation of the mobile body 100, including control of each of the functional parts included in the mobile body 100. The ECU 50 may include at least one processor such as a central processing unit (CPU), to provide control and processing capacity for achieving various functions. The ECU 50 may be implemented by one processor, by several processors, or by respective separate processors. Each processor may be implemented as a single integrated circuit (IC). Each processor may be implemented as a plurality of integrated circuits and/or discrete circuits communicably connected to one another. Each processor may be implemented based on any of other various known techniques. In an embodiment, the ECU 50 may be implemented, for example, by a CPU and a program executed by the CPU. The ECU 50 may include a memory necessary for the operation of the ECU 50. The ECU 50 may have at least part of the functions of the controller 10, and the controller 10 may have at least part of the functions of the ECU 50.

Although the electronic device 1 illustrated in FIG. 2 includes two transmission antennas 25 and four reception antennas 31, the electronic device 1 according to the embodiment may include any number of transmission antennas 25 and any number of reception antennas 31. For example, the inclusion of two transmission antennas 25 and four reception antennas 31 enables the electronic device 1 to have a virtual antenna array composed of eight antennas virtually. For example, the electronic device 1 may receive the reflected waves R of 16 subframes illustrated in FIG. 3, by using the virtual eight antennas.

Figure 4:
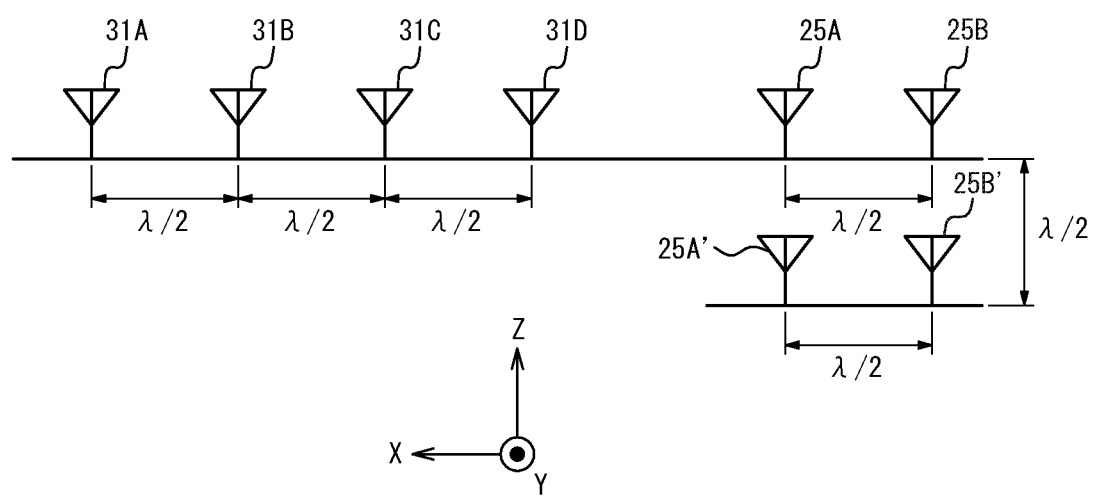
FIG. 4 is a diagram illustrating an example of arrangement of transmission antennas and reception antennas in the electronic device according to the embodiment.

FIG. 4 is a diagram illustrating an example of arrangement of transmission antennas and reception antennas in the electronic device according to the embodiment. The directions of X-axis, Y-axis, and Z-axis in FIG. 4 may be the same as the directions of X-axis, Y-axis, and Z-axis in FIG. 1.

For example, the sensor 5 in the electronic device 1 according to the embodiment may include two transmission antennas 25A and 25A', as illustrated in FIG. 4. The sensor 5 in the electronic device 1 according to the embodiment may also include four reception antennas 31A, 31B, 31C, and 31D, as illustrated in FIG. 4.

The four reception antennas 31A, 31B, 31C, and 31D are arranged at an interval $\lambda/2$ in the horizontal direction (X-axis direction), where X is the wavelength of the transmission waves T. By aligning the plurality of reception antennas 31 in the horizontal direction and receiving the transmission waves T by the plurality of reception antennas 31, the electronic device 1 can estimate the direction in which the reflected waves R reach. For example, in the case where the frequency band of the transmission waves T is 77 GHz to 81 GHz, the wavelength $\lambda$ of the transmission waves T may be the wavelength of the transmission waves T at the center frequency 79 GHz.

The two transmission antennas 25A and 25A' are arranged at an interval $\lambda/2$ in the vertical direction (Z-axis direction), where X is the wavelength of the transmission waves T. By aligning the plurality of transmission antennas 25 in the vertical direction and transmitting the transmission waves T by the plurality of transmission antennas 25, the electronic device 1 can change the direction of the beam of the transmission waves T to the vertical direction.

The sensor 5 in the electronic device 1 according to the embodiment may include, for example, four transmission antennas 25A, 25A', 25B, and 25B', as illustrated in FIG. 4.

The two transmission antennas 25A and 25B are arranged at an interval $\lambda/2$ in the horizontal direction (X-axis direction) where $\lambda$ is the wavelength of the transmission waves T, as illustrated in FIG. 4. The two transmission antennas 25A' and 25B' are arranged at an interval $\lambda/2$ in the horizontal direction (X-axis direction) where X is the wavelength of the transmission waves T, as illustrated in FIG. 4. Thus, by aligning a plurality of transmission antennas 25 in the horizontal direction and transmitting the transmission waves T from the plurality of transmission antennas 25, the electronic device 1 can change the direction of the beam of the transmission waves T to the horizontal direction.

The two transmission antennas 25B and 25B' are arranged at an interval λ/2 in the vertical direction (Z-axis direction) where X is the wavelength of the transmission waves T, as illustrated in FIG. 4. Thus, by aligning a plurality of transmission antennas 25 in the vertical direction and transmitting the transmission waves T from the plurality of transmission antennas 25 in the arrangement illustrated in FIG. 4, the electronic device 1 can change the direction of the beam of the transmission waves T to the vertical direction.

In the electronic device 1 according to the embodiment, in the case of beamforming the transmission waves T transmitted from the plurality of transmission antennas 25, the transmission waves T of the plurality of transmission antennas 25 may be in phase with each other in a predetermined direction based on the path difference when transmitting the transmission waves T of the plurality of transmission antennas 25. In the electronic device 1 according to the embodiment, for example, the phase controller 23 may control the phase of the transmission waves transmitted from at least one of the plurality of transmission antennas 25 so that the transmission waves T of the plurality of transmission antennas 25 will be in phase with each other in the predetermined direction.

The amount of phase controlled so that the plurality of transmission waves T will be in phase with each other in the predetermined direction may be stored in the memory 40 in association with the predetermined direction. That is, the relationship between the beam direction and the phase amount when performing beamforming may be stored in the memory 40.

The relationship may be determined, for example, based on actual measurement in a test environment, before object detection by the electronic device 1. In the case where the relationship is not stored in the memory 40, the phase controller 23 may estimate the relationship as appropriate based on predetermined data such as past measurement data. In the case where the relationship is not stored in the memory 40, the phase controller 23 may acquire an appropriate relationship through, for example, network connection to the outside.

In the electronic device 1 according to the embodiment, at least one of the controller 10 and the phase controller 23 may perform control to beamform the transmission waves T transmitted from the plurality of transmission antennas 25. In the electronic device 1 according to the embodiment, a functional part including at least the phase controller 23 is also referred to as "transmission controller".

Thus, in the electronic device 1 according to the embodiment, the transmission antenna 25 may include a plurality of transmission antennas. Moreover, in the electronic device 1 according to the embodiment, the reception antenna 31 may include a plurality of reception antennas. In the electronic device 1 according to the embodiment, the transmission controller (e.g. the phase controller 23) may perform control to form (beamforming) a beam of the transmission waves T transmitted from the plurality of transmission antennas 25 in the predetermined direction. In the electronic device 1 according to the embodiment, the transmission controller (e.g. the phase controller 23) may form the beam in the direction of the object detection range.

In the electronic device 1 according to the embodiment, the transmission antenna 25 may include a plurality of transmission antennas 25 arranged to include a vertical component, as mentioned above. In this case, in the electronic device 1 according to the embodiment, the phase controller 23 (transmission controller) may change the direction of the beam to the direction of the object detection range, including the vertical component.

Moreover, in the electronic device 1 according to the embodiment, the transmission antenna 25 may include a plurality of transmission antennas 25 arranged to include a horizontal component, as mentioned above. In this case, in the electronic device 1 according to the embodiment, the phase controller 23 (transmission controller) may change the direction of the beam to the direction of the object detection range, including the horizontal component.

In the electronic device 1 according to the embodiment, the transmission controller (e.g. the phase controller 23) may form the beam in a direction that covers at least part of the object detection range. In the electronic device 1 according to the embodiment, the transmission controller (e.g. the phase controller 23) may control the phase of the transmission waves transmitted from at least one of the plurality of transmission antennas 25 so that the transmission waves T of the plurality of transmission antennas 25 will be in phase with each other in the predetermined direction.

The electronic device 1 according to the embodiment can calculate a phase compensation value based on frequency information of a wide frequency band signal (e.g. FMCW signal) output from the plurality of transmitting antennas 25, and perform frequency-dependent phase compensation on each of the plurality of transmitting antennas. In this way, beamforming can be performed with high accuracy in a specific direction in all possible frequency bands of the transmission signal.

With such beamforming, the distance within which object detection is possible can be expanded in a specific direction in which object detection is required. Moreover, with such beamforming, a reflection signal from any unnecessary direction can be reduced. This improves the distance/angle detection accuracy.

Operations of the electronic device 1 according to the embodiment will be described below.

Conventionally, in the case of using radar capable of object detection in an object detection range of a wide angle (e.g. arrival angle θ illustrated in FIG. 1), scanning the whole range tends to take relatively long time. For example, when the object detection range is 160° (±80°), the scan angle is 5°, and the update period is 20 fps, one scan period is likely to be approximately 1.6 s. Such a time may cause a delay which is disadvantageous for object detection by on-vehicle radar. In addition, in the case of performing processing such as averaging on the ground that the degree of certainty of the detection result is insufficient, more time is required. Thus, there are situations in which such a measure is not very useful.

In view of this, for example, object detection may be performed with a rougher scan density of the angle for transmitting the transmission waves T. In this way, the scan time can be reduced as a whole. Roughing the scan density of the angle, however, results in lower accuracy in estimating the arrival angle at which the reflected waves R are incident from the object. When such object detection is performed with a wide scan angle, the detection accuracy is likely to decrease.

By using a radar sensor including a plurality of transmission antennas 25 and a plurality of reception antennas 31 in the electronic device 1 according to the embodiment, the object detection accuracy may be able to be improved based on the reception signal received as the reflected waves R. For example, in the case of performing object detection in a detection range of a wide angle, if the interval between the plurality of reception antennas is λ/2, sensing for ±90° is theoretically possible. With millimeter-wave radar that can use a frequency band from 77 GHz to 81 GHz, object detection can be performed by suitably using a frequency band of 4 GHz. In this case, the distance resolution is 3.75 cm (=3×10$^8$ [m/s]/(2×4 GHz)), so that highly accurate detection is possible.

FIGS. 5 to 8 are each a diagram illustrating an operation of the electronic device 1 according to the embodiment.

Figure 5:
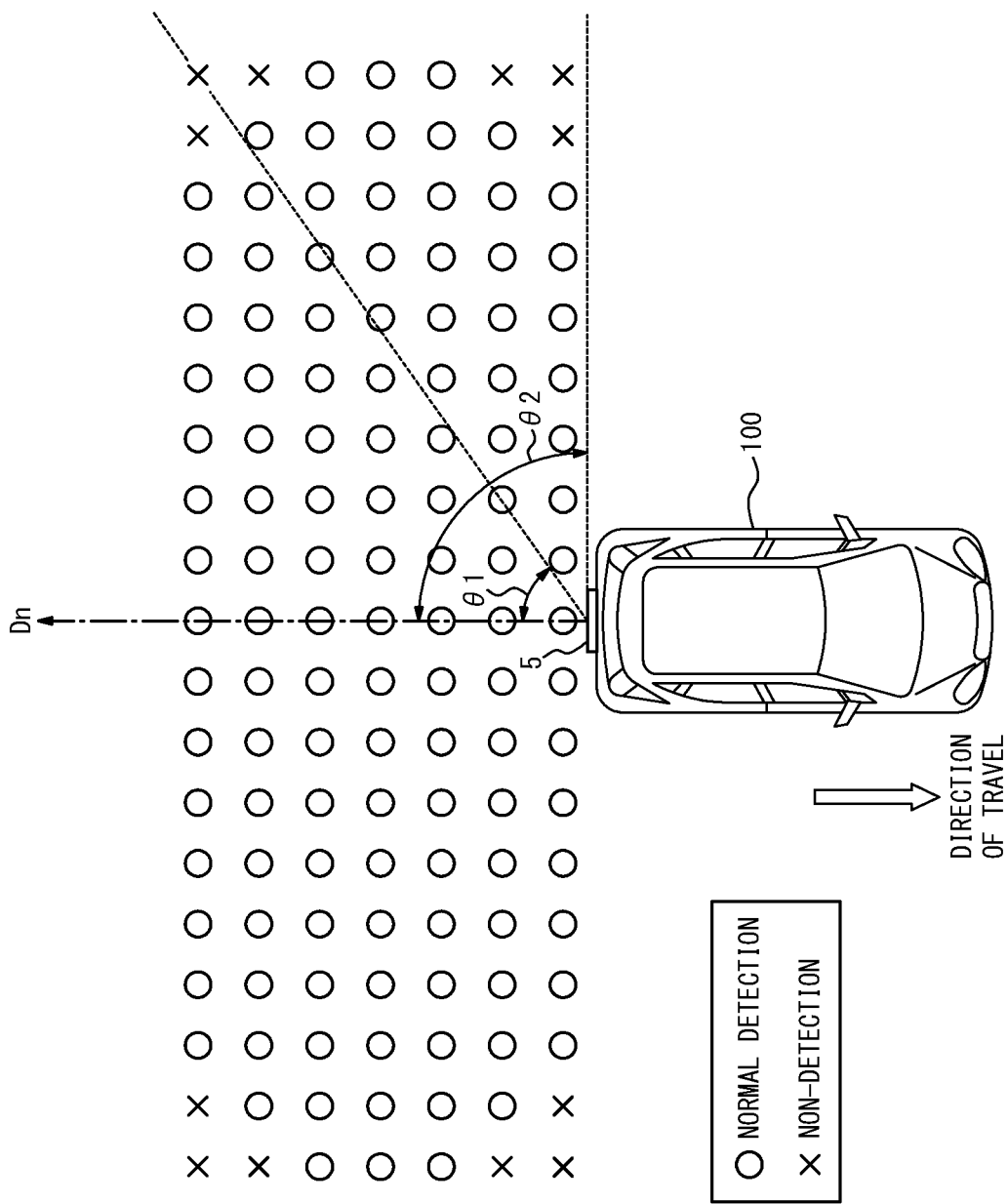
FIG. 5 is a diagram illustrating an operation of the electronic device according to the embodiment.

The sensor 5 according to the embodiment is installed in the mobile body 100 illustrated in FIG. 5, as in the example illustrated in FIG. 1. Moreover, the electronic device 1 according to the embodiment is mounted (e.g. included) in the mobile body 100 illustrated in FIG. 5, as in the example illustrated in FIG. 1. The mobile body 100 may move (run or slow down) in the arrow direction (direction of travel) in the drawing, or be stationary without moving.

In the example illustrated in FIG. 5, only one sensor 5 is installed at the back of the mobile body 100. The position at which the sensor 5 is installed in the mobile body 100 is not limited to the back of the mobile body 100, and the sensor 5 may be installed at any other position as appropriate instead of or in addition to the back of the mobile body 100. The state diagram in FIG. 5 may be displayed on any appropriate screen such as a screen of a display of the mobile body 100, a smartphone, or a tablet.

The electronic device 1 mounted in the mobile body 100 can detect an object around the mobile body 100 (mainly the back of the mobile body 100 in this example), based on the transmission waves transmitted from the sensor 5 and the reception waves received by the sensor 5. The electronic device 1 according to the embodiment can classify the detection result of the object reflecting the transmission waves T depending on the degree of certainty and output it, as illustrated in FIG. 5. The classification of the detection result of the object reflecting the transmission waves T depending on the degree of certainty will be described below.

The electronic device 1 according to the embodiment can classify whether the reflection power of the object around the mobile body 100 is sufficient and output it, as illustrated in FIG. 5. Whether the reflection power of the object around the mobile body 100 is sufficient may depend on, for example, the gain of the transmission antennas 25 and the reception antennas 31, the reflection coefficient of the object around the mobile body 100, and the like.

FIG. 5 is a diagram schematically illustrating the classification of whether the reflection power of the object is sufficient, in a visualized form. For example, in FIG. 5, a part where the reflection power of the detected object is sufficient is designated by a circle mark as a part where "normal detection" is performed. In FIG. 5, a part where the reflection power of the detected object is not sufficient is designated by a cross mark as a part where normal detection is not performed, i.e. a part of "non-detection". Thus, the controller 10 in the electronic device 1 according to the embodiment classifies the detection result of the object reflecting the transmission waves T depending on the degree of certainty and outputs it. Herein, the "degree of certainty" of information may be the degree of probability (likelihood) of the information, and is a broader concept including "reliability" and "accuracy or preciseness" as subordinate concepts.

Information indicating a result of classification such as a part of "normal detection" designated by a circle mark and a part of "non-detection" designated by a cross mark is hereafter also simply referred to as "classification information". Thus, the electronic device 1 according to the embodiment may output information (classification information) obtained by classifying the detection result of the object reflecting the transmission waves T in stages depending on the degree of certainty of detection.

The example illustrated in FIG. 5 corresponds to an ideal case where normal detection of an object is possible in most parts of the range of object detection by the electronic device 1. Meanwhile, in the example illustrated in FIG. 5, object detection is not possible in some parts of the range of object detection by the electronic device 1.

In the range of object detection by the electronic device 1, some parts at a relatively long distance from the sensor 5 are designated as "non-detection", as illustrated in FIG. 5. For example, each part at a long distance from the sensor 5 in a direction in which the incidence angle of the reflected waves R (the arrival angle of the reflected waves R) is an angle θ1 from a reference direction Dn is designated as "non-detection", as illustrated in FIG. 5. Moreover, in the range of object detection by the electronic device 1, each part where the incidence angle of the reflected waves R (the arrival angle of the reflected waves R) is large with respect to the reference direction Dn is designated as "non-detection", as illustrated in FIG. 5. For example, each part at a long distance from the sensor 5 in a direction in which the incidence angle of the reflected waves R (the arrival angle of the reflected waves R) is an angle θ2 (close to 90°) from the reference direction Dn is designated as "non-detection", as illustrated in FIG. 5.

Here, the interval λ/2 between the plurality of reception antennas 31 depends on hardware as illustrated in FIG. 4, and a manufacturing error typically occurs. The following description concerns the case where the interval between the plurality of reception antennas 31 contains a manufacturing error.

For example, consider the case where the plurality of reception antennas 31 illustrated in FIG. 4 have a manufacturing error of about 24 μm greater than an antenna interval of 1.8987 mm that is designed assuming a frequency of 79 GHz. In such a case, the interval between the reception antennas 31 is approximately the same as the antenna interval designed assuming a frequency of 78 GHz. The path difference of the radio waves in this case causes a decrease in object detection accuracy.

The interval λ/2 between the reception antennas 31 designed assuming a frequency of 77 GHz is 1.9480 mm. The interval λ/2 between the reception antennas 31 designed assuming a frequency of 78 GHz is 1.9231 mm. In this case, the path difference at 79 GHz is 24 μm. The interval λ/2 between the reception antennas 31 designed assuming a frequency of 79 GHz is 1.8987 mm. The interval λ/2 between the reception antennas 31 designed assuming a frequency of 80 GHz is 1.8750 mm. In this case, the path difference at 79 GHz is −23 μm. The interval λ/2 between the reception antennas 31 designed assuming a frequency of 81 GHz is 1.8518 mm. In the foregoing calculation, λ=light speed/frequency, where the light speed is 3.0×10$^8$ [m/s].

As mentioned above, for example in the case where the center frequency of the radio waves used in object detection is 79 GHz and the interval between the reception antennas 31 contains a manufacturing error (e.g. as in the case where 78 GHz is assumed), if object detection is performed in a direction of a wide angle, an error may occur in the estimation by the arrival angle estimation unit 13. Herein, the "direction of a wide angle" may be, for example, a direction for which the angle between a straight line corresponding to the incidence angle of the reflected waves R (the arrival angle of the reflected waves R) and a straight line representing the reference direction Dn is greater than or equal to an angle close to 90°. Such an estimation error is presumed to be caused by a mismatch between the frequency corresponding to the antenna interval of the reception antennas 31 configured as hardware and the frequency processed by software.

Figure 6:
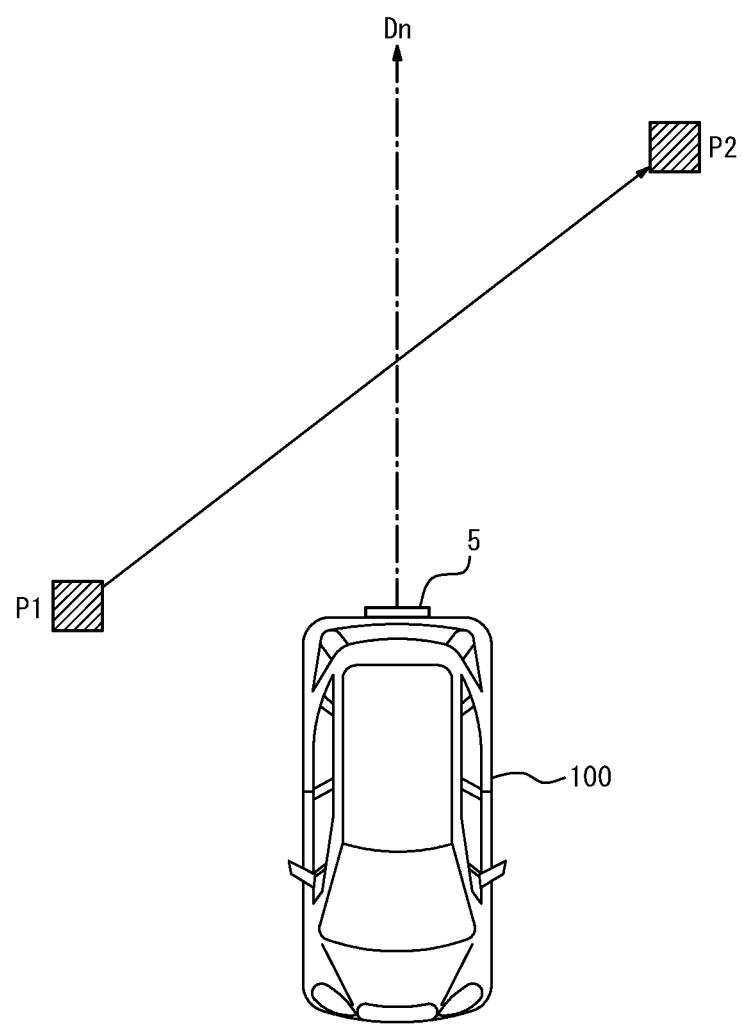
FIG. 6 is a diagram illustrating an operation of the electronic device according to the embodiment.
Figure 7:
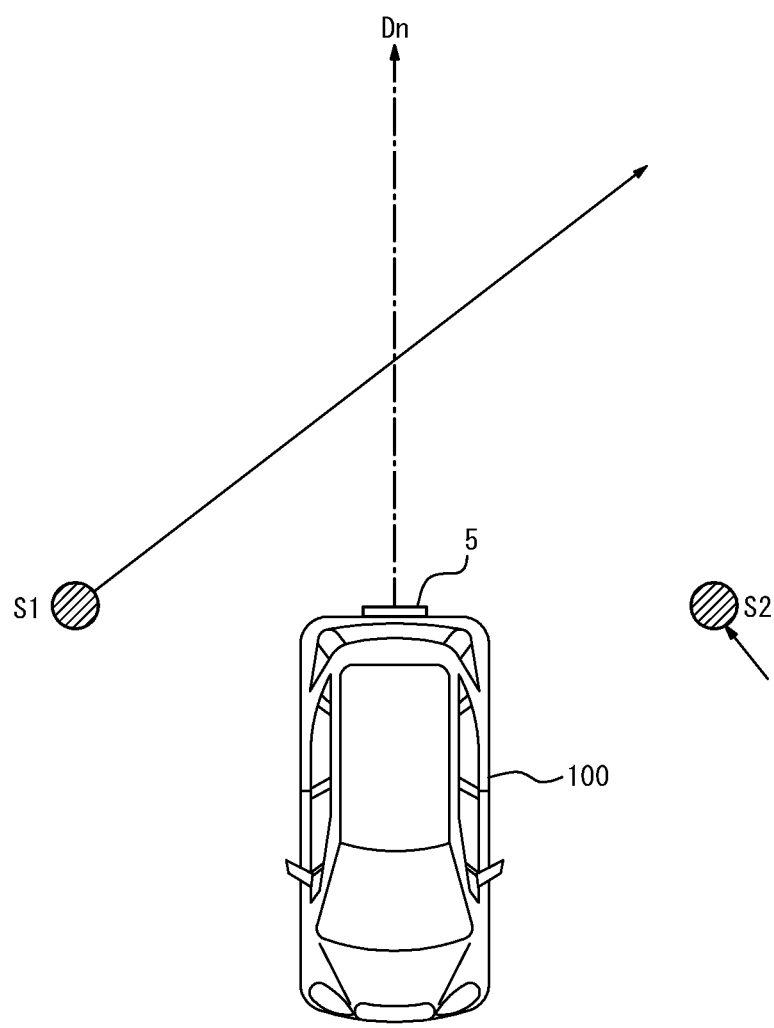
FIG. 7 is a diagram illustrating an operation of the electronic device according to the embodiment.

In the case where the antenna interval of the reception antennas 31 due to the manufacturing error and the center frequency of the radio waves do not match, a situation in which the information representing the detected object does not continuously change with time can arise. For example, suppose the object moves from position P1 to position P2 during object detection by the sensor 5 installed in the mobile body 100 having the electronic device 1 mounted therein, as illustrated in FIG. 6. Here, the mobile body 100 may be stationary. When the electronic device 1 detects such a state in which the object has moved from position P1 to position P2, for example, there is a possibility that the object that has moved continuously is detected as having moved discontinuously from position S1 to position S2, as illustrated in FIG. 7. In such a case where the information representing the detected object does not continuously change with time, the arrival angle estimation unit 13 possibly wrongly estimates the incidence angle when receiving the reflected waves R.

Hence, in the case where the incidence angle when receiving the reflected waves R is possibly wrongly estimated as described above, the electronic device 1 according to the embodiment may also output this information as classification information.

Figure 8:
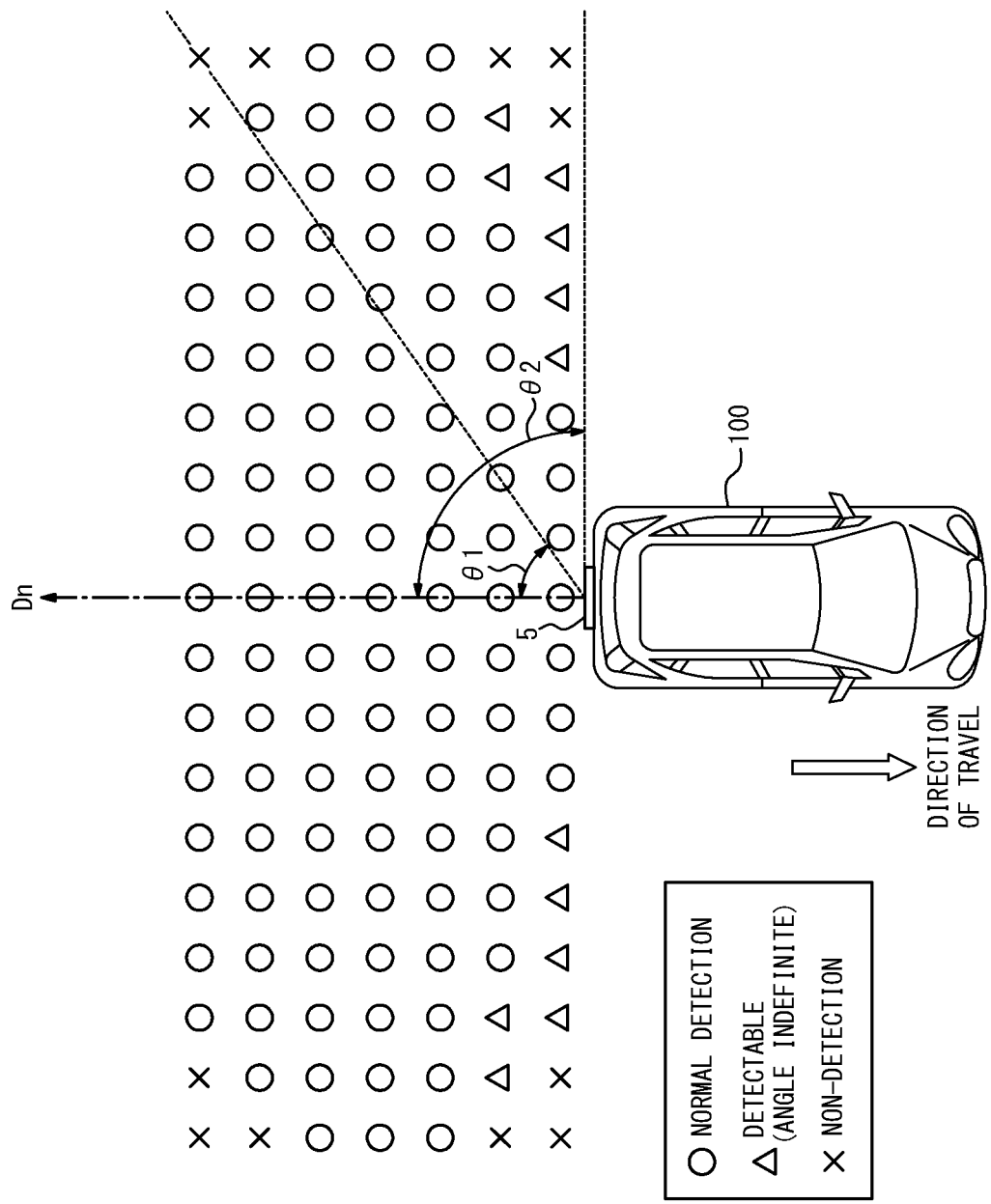
FIG. 8 is a diagram illustrating an operation of the electronic device according to the embodiment.

FIG. 8 is a diagram illustrating an example of classification information output by the electronic device 1 according to the embodiment. The same description as the description made with reference to FIG. 5 will be simplified or omitted as appropriate.

FIG. 8 is a diagram schematically illustrating the classification of whether the reflection power of the object is sufficient in a visualized form, as in FIG. 5. The state diagram in FIG. 8 may be displayed on any appropriate screen such as a screen of a display of the mobile body 100, a smartphone, or a tablet.

In FIG. 8, a part where the reflection power of the detected object is sufficient is designated by a circle mark as a part where "normal detection" is performed (i.e. an object is present). In FIG. 8, the part of "normal detection" may be a part for which it is determined that the incidence angle when receiving the reflected waves R is not wrongly estimated (i.e. is correctly estimated) as a result of the arrival angle estimation unit 13 performing arrival angle estimation using transmission waves T of a plurality of frames. In FIG. 8, a part where the reflection power of the detected object is not sufficient is designated by a cross mark as a part where normal detection is not performed (i.e. an object is not present), i.e. a part of "non-detection".

Further, in FIG. 8, a part where the reflection power of the detected object is greater than or equal to a predetermined value but it is determined that the incidence angle when receiving the reflected waves R is possibly wrongly estimated is designated by a triangle mark as "detectable (angle indefinite)". The part where the incidence angle when receiving the reflected waves R is possibly wrongly estimated may be a part where an error can be caused by a mismatch between the frequency defined as the antenna interval of the reception antennas 31 by hardware and the frequency processed by software. The part where the incidence angle when receiving the reflected waves R is possibly wrongly estimated may be a part where the reflection power of the detected object is insufficient and an error can occur in the angle estimation by the arrival angle estimation unit 13.

That is, the part of "detectable (angle indefinite)" designated by a triangle mark in FIG. 8 may be a part where an object is detected but the detection angle is unable to be determined. For example, the parts of "detectable (angle indefinite)" each designated by a triangle mark in FIG. 8 are symmetrically located on the right and left sides at the back of the mobile body 100. In this case, each part of "detectable (angle indefinite)" may be a part where an object is detected but whether the object is actually present on the right or left side at the back of the mobile body 100 is unable to be determined. For example, in the part of "detectable (angle indefinite)", there is a possibility that, despite the object being actually present on the right side at the back of the mobile body 100, the electronic device 1 detects the object on the left side at the back of the mobile body 100.

Thus, the controller 10 in the electronic device 1 according to the embodiment classifies the detection result of the object reflecting the transmission waves T depending on the degree of certainty and outputs it. More specifically, the controller 10 in the electronic device 1 according to the embodiment may output information (classification information) obtained by classifying the detection result of the object reflecting the transmission waves T in stages depending on the degree of certainty of detection.

The controller 10 in the electronic device 1 according to the embodiment may display the classification information on a predetermined display such as a liquid crystal display (LCD) connected to the electronic device 1. The display can display the classification information as information provided to the driver of the mobile body 100 or the like. In this case, the electronic device 1 can notify the driver of the mobile body 100 or the like whether an detected object is present, in a state of being classified depending on the degree of certainty.

The electronic device 1 according to the embodiment may further include a display. The display may display the information that is output from the controller 10 and in which the detection result of the object reflecting the transmission waves T is classified depending on the degree of certainty.

The controller 10 in the electronic device 1 according to the embodiment may supply the classification information to, for example, the ECU 50. The ECU 50 can then use the information of the result of classification by the classification processor 15 for driving assistance for the driver, automatic driving, and the like.

Thus, the controller 10 in the electronic device 1 according to the embodiment may supply the classification information to, for example, a controller (e.g. ECU 50) in the mobile body 100 to which the electronic device 1 is connected.

The electronic device 1 according to the embodiment can classify the detection result of the object reflecting the transmission waves T depending on the degree of certainty and output it, for example as illustrated in FIG. 8. In detail, the electronic device 1 according to the embodiment can present easily recognizable information that an object is present in each part of "normal detection", an object is not present in each part of "non-detection", and an object is present but the direction is unable to be determined in each part of "detectable (angle indefinite)". Therefore, for example in the case of moving the mobile body 100 in a direction in which visibility is poor, the driver of the mobile body 100 can refer to the classification information in which whether an detected object is present is classified depending on the degree of certainty by the electronic device 1. The electronic device 1 according to the embodiment can thus improve convenience in object detection.

The electronic device 1 according to the embodiment can classify and output the degree of certainty of detection in the detection range (detection distance/detection angle), and, for example, visualize the output result. In this way, the electronic device 1 according to the embodiment can output information that an object is detected, an object is not detected, and an object is detected but the direction is unable to be determined in the detection range. Consequently, the user of the electronic device 1 such as the driver of the mobile body 100 and/or a system of the mobile body 100 can be informed of priority in reliability.

Figure 9:
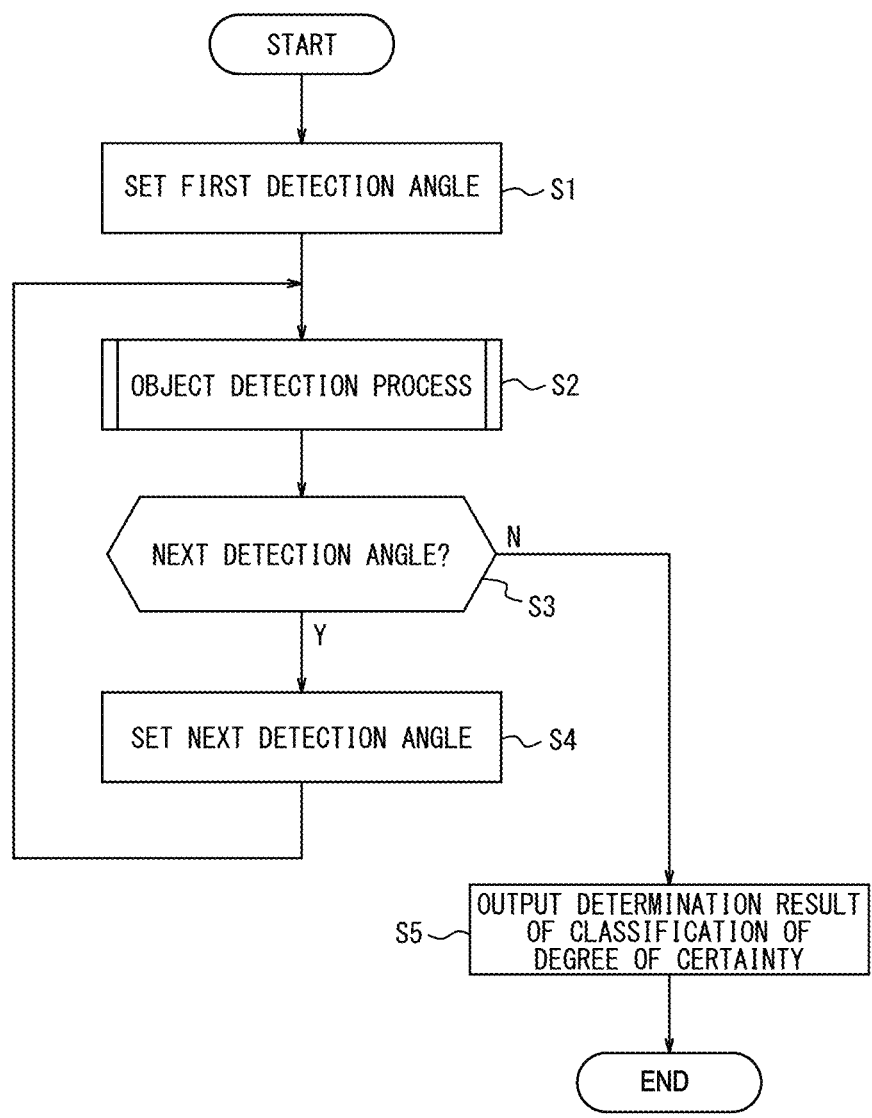
FIG. 9 is a flowchart illustrating an operation of the electronic device according to the embodiment.
Figure 10:
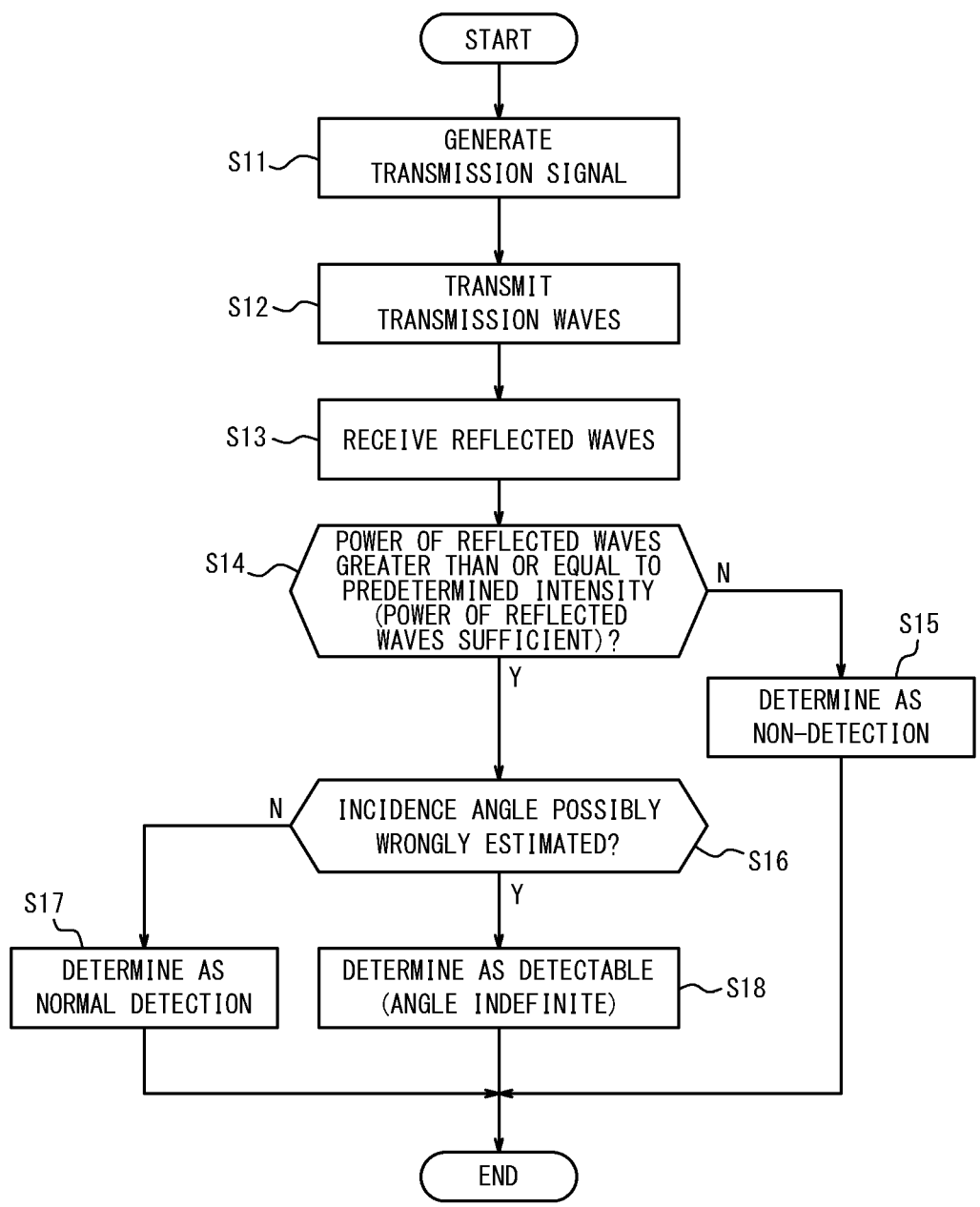
FIG. 10 is a flowchart illustrating another operation of the electronic device according to the embodiment.

FIGS. 9 and 10 are each a flowchart illustrating an operation of the electronic device 1 according to the embodiment. FIG. 9 is a flowchart illustrating an overall operation of the electronic device 1 according to the embodiment. FIG. 10 is a flowchart illustrating a detailed process in step S2 in FIG. 9. The flow of operation of the electronic device 1 according to the embodiment will be described below.

The operation illustrated in FIG. 9 may be started, for example, when the electronic device 1 mounted in the mobile body 100 performs detection of an object around the mobile body 100.

After the operation illustrated in FIG. 9 starts, the controller 10 sets the first detection angle (step S1). Before the process in step S1, the electronic device 1 defines the angle of the detection range such as that illustrated in FIG. 8 beforehand. For example, in the electronic device 1 according to the embodiment, an angle of ±90° with respect to the reference direction Dn in FIG. 8 may be set as the detection range. Before the process in step S1, the electronic device 1 defines the scan angle (i.e. the increment of the scan angle during detection) of the detection range, for example, 5°. In this example, the electronic device 1 according to the embodiment performs object detection at a scan angle of 5° in the detection angle range of −90° to +90° with respect to the reference direction Dn in FIG. 8. In step S1, for example, an angle of −90° may be set as the first detection angle. In this case, the next detection angle may be −85°.

The detection angle range and the scan angle may be set beforehand and stored in the memory 40. The detection angle range and the scan angle set by the user of the electronic device 1 may be stored in the memory 40.

After the first detection angle is set in step S1, the controller 10 performs an object detection process (step S2). In step S2, a process of determining the intensity of the power of the reflected waves R and the like by transmitting the transmission waves T and receiving the reflected waves R is performed. The process in step S2 will be described in detail later.

After the object detection process is performed in step S2, the controller 10 determines whether there is the next detection angle (step S3).

In the case where the first detection angle is −90°, the next detection angle may be −85°, as mentioned above. In the case where there is the next detection angle in step S3, the controller 10 sets the next detection angle (step S4). After step S4, the controller 10 returns to step S2, and repeats the process in steps S2 and S3 until there is no more next detection angle.

In the case where the detection angle is +90° in step S3, this is the last angle in the cycle, and there is no more next detection angle. In the case where there is no next detection angle in step S3, the controller 10 outputs information (e.g. classification information) of the determination result of the classification of the degree of certainty, for all angles used for object detection (step S5). As a result of performing the operation to step S5, the electronic device 1 can output, for example, the classification information illustrated in FIG. 8.

FIG. 10 is a flowchart illustrating the object detection process in step S2 in FIG. 9 in more detail. The flow of the object detection process in step S2 in FIG. 9 will be described below.

After the process illustrated in FIG. 10 starts, the signal generator 21 generates the transmission signal to be transmitted from the transmission antenna 25 as the transmission waves T (step S11). In step S11, the signal generator 21 may generate the transmission signal (e.g. chirp signal) of the frequency selected by the frequency selector 17. As the frequency selected by the frequency selector 17, for example, a default frequency may be stored in the memory 40.

In the case where the frequency selector 17 corrects the frequency as described later, the frequency selector 17 notifies the signal generator 21 of the corrected frequency. The signal generator 21 then generates the transmission signal of the frequency corrected by the frequency selector 17.

After the transmission signal is generated in step S11, the controller 10 transmits the generated transmission signal from the transmission antenna 25 as the transmission waves T (step S12). Since the transmission of the transmission waves T in step S12 can be performed in the same way as transmission of transmission waves by known radar technology, more detailed description is omitted.

After the transmission waves are transmitted in step S12, the controller 10 receives the reflected waves R resulting from reflection of the transmission waves T off the object, by the reception antenna 31 (step S13). Since the reception of the reflected waves R in step S13 can be performed in the same way as reception of reflected waves by known radar technology, more detailed description is omitted.

After the reflected waves R are received in step S13, the controller 10 determines whether the power of the reflected waves R is greater than or equal to a predetermined intensity (step S14). In step S14, the classification processor 15 in the controller 10 may store a preset threshold in, for example, the memory 40, in order to determine whether the power of the reflected waves R is greater than or equal to the predetermined intensity. For example, the threshold may be set based on the power of the reflected waves R that is expected to ensure object detection. In other words, the threshold may be a sufficient value as the intensity of the reflected waves R with which it is determined that an object is detected.

The threshold may be determined, for example, based on actual measurement in a test environment, before object detection by the electronic device 1. In the case where the threshold is not stored in the memory 40, the classification processor 15 may estimate the threshold as appropriate based on predetermined data such as past measurement data. In the case where the threshold is not stored in the memory 40, the classification processor 15 may acquire an appropriate threshold through, for example, network connection to the outside.

In the case where the controller 10 determines that the power of the reflected waves R is less than the predetermined intensity in step S14, the classification processor 15 determines that an object is not detected, i.e. "non-detection" illustrated in FIG. 8 (step S15). Thus, in the case where the intensity of the reflected waves R resulting from reflection of the transmission waves T off the object is less than the predetermined intensity, the controller 10 in the electronic device 1 according to the embodiment may make a classification that the object reflecting the transmission waves T is not detected.

In the case where the controller 10 determines that the power of the reflected waves R is greater than or equal to the predetermined intensity in step S14, the discontinuity detector 16 determines whether the incidence angle of the reflected waves R is possibly wrongly estimated (step S16). An example of the case where the incidence angle of the reflected waves R is possibly wrongly estimated is an instance where, despite the object being actually present on the right side at the back of the mobile body 100, the electronic device 1 detects the object on the left side at the back of the mobile body 100, as described with reference to FIG. 8.

In step S16, for example, the discontinuity detector 16 may determine whether the incidence angle when receiving the reflected waves R is possibly wrongly estimated, by estimating the incidence angle when receiving the reflected waves R by the arrival angle estimation unit 13. In detail, for example in the case where the information representing the detected object 10 does not continuously change with time, the discontinuity detector 16 may determine that the incidence angle when receiving the reflected waves R is possibly wrongly estimated.

In step S16, for example, in the case where the arrival angle estimation unit 13 estimates that the incidence angle when receiving the reflected waves R is greater than or equal to a predetermined angle (e.g. 80°), the discontinuity detector 16 may determine that the incidence angle when receiving the reflected waves R is possibly wrongly estimated. In detail, for example in the case where the incidence angle when receiving the reflected waves R is estimated to be close to 90° with respect to the reference direction Dn, the discontinuity detector 16 may determine that the incidence angle when receiving the reflected waves R is possibly wrongly estimated.

In the case where the discontinuity detector 16 does not determine that the incidence angle is possibly wrongly estimated in step S16, the classification processor 15 determines that an object is detected, i.e. "normal detection" illustrated in FIG. 8 (step S17). Thus, in the case where the intensity of the reflected waves R resulting from reflection of the transmission waves T off the object is greater than or equal to the predetermined value, the controller 10 in the electronic device 1 according to the embodiment may make a classification that the object reflecting the transmission waves T is detected.

In the case where the discontinuity detector 16 determines that the incidence angle is possibly wrongly estimated in step S16, the classification processor 15 determines that an object is detected but the angle is unable to be determined, i.e. "detectable (angle indefinite)" illustrated in FIG. 8 (step S18). Thus, in the case where the intensity of the reflected waves R resulting from reflection of the transmission waves T off the object is greater than or equal to the predetermined value and the incidence angle when receiving the reflected waves R is possibly wrongly estimated, the controller 10 in the electronic device 1 according to the embodiment may make a classification that the object reflecting the transmission waves T is detected but the incidence angle is unable to be determined.

In particular, in the case where the incidence angle when receiving the reflected waves R is possibly estimated in an inverted state, the controller 10 may make a classification that the object reflecting the transmission waves T is detected but the incidence angle is unable to be determined. An example of the case where the incidence angle when receiving the reflected waves R is inverted is an instance where, despite the object being actually present on the right side at the back of the mobile body 100, the electronic device 1 detects the object on the left side at the back of the mobile body 100, as described with reference to FIG. 8.

A correction process in the case where the incidence angle when receiving the reflected waves R is possibly estimated in an inverted state in the electronic device 1 according to the embodiment will be described below.

In the case where the process advances to step S18 in FIG. 10, the incidence angle when receiving the reflected waves R is possibly wrongly estimated. In such a case, by lowering the frequency of the transmission waves T, the wavelength λ of the transmission waves T is increased, with it being possible to reduce the risk that the incidence angle when receiving the reflected waves R is wrongly estimated.

For example, in the case where the center frequency of the transmission waves T is 79 GHz and the incidence angle when receiving the reflected waves R is large, e.g. close to 90°, the risk that the incidence angle is wrongly estimated is high. In such a case, for example, the frequency of the transmission waves T is lowered by reducing the center frequency of the transmission waves T to 78.8 GHz. Hence, the risk that the incidence angle is wrongly estimated is reduced even in the case where the incidence angle when receiving the reflected waves R is close to 90°.

Figure 11:
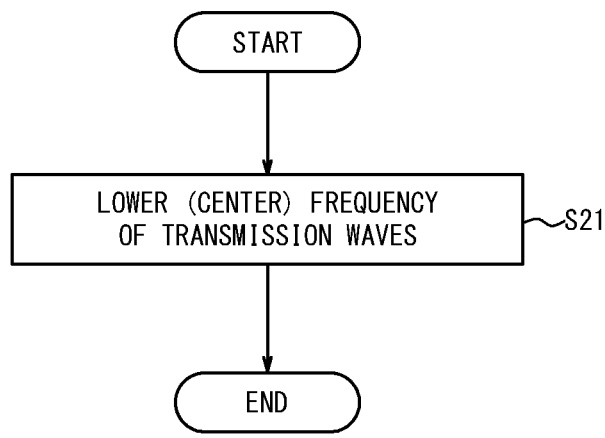
FIG. 11 is a flowchart illustrating another operation of the electronic device according to the embodiment.

FIG. 11 is a flowchart illustrating the correction process in the case where the incidence angle when receiving the reflected waves R is possibly estimated in an inverted state.

For example, the process illustrated in FIG. 11 may be performed following step S18 in FIG. 10.

After the process illustrated in FIG. 11 starts, the frequency selector 17 in the controller 10 corrects the frequency or the center frequency of the transmission waves T to be lower than a predetermined frequency (step S21). The frequency used when correcting the frequency or the center frequency of the transmission waves T to be lower than the predetermined frequency may be stored in the memory 40 as a frequency appropriately defined beforehand. In the present disclosure, after the process illustrated in FIG. 11 starts, the frequency selector 17 in the controller 10 may correct the frequency or the center frequency of the transmission waves T to be higher than the predetermined frequency (step S21). The present disclosure applies to both the case of correcting the frequency or the center frequency of the transmission waves T to be lower than the predetermined frequency and the case of correcting the frequency or the center frequency of the transmission waves T to be higher than the predetermined frequency.

The frequency used to perform the correction may be determined, for example, based on actual measurement in a test environment, before object detection by the electronic device 1. In the case where the frequency is not stored in the memory 40, the frequency selector 1 may set the frequency as appropriate based on predetermined data such as past measurement data. In the case where the frequency is not stored in the memory 40, the frequency selector 17 may acquire an appropriate frequency through, for example, network connection to the outside.

Thus, the controller 10 in the electronic device 1 according to the embodiment may correct the frequency of the transmission waves T to be higher or lower, in the case where the controller 10 determines that the incidence angle when receiving the reflected waves R is possibly wrongly estimated. For example, the controller 10 in the electronic device 1 according to the embodiment may correct the frequency of the transmission waves T to be less than or equal to the predetermined frequency in the predetermined frequency band, in the case where the controller 10 determines that the incidence angle when receiving the reflected waves R is possibly wrongly estimated.

With the electronic device 1 according to the embodiment, even in a situation in which the incidence angle when receiving the reflected waves R is possibly estimated in an inverted state, the risk that the incidence angle when receiving the reflected waves R is estimated in an inverted state is reduced by correcting the frequency of the transmission waves T. The electronic device 1 according to the embodiment can thus improve convenience in object detection.

While some embodiments and examples of the present disclosure have been described above by way of drawings, various changes and modifications may be easily made by those of ordinary skill in the art based on the present disclosure. Such changes and modifications are therefore included in the scope of the present disclosure. For example, the functions included in the functional parts, etc. may be rearranged without logical inconsistency, and a plurality of functional parts, etc. may be combined into one functional part, etc. and a functional part, etc. may be divided into a plurality of functional parts, etc. Moreover, each of the disclosed embodiments is not limited to the strict implementation of the embodiment, and features may be combined or partially omitted as appropriate. That is, various changes and modifications may be made to the presently disclosed techniques by those of ordinary skill in the art based on the present disclosure. Such changes and modifications are therefore included in the scope of the present disclosure. For example, functional parts, means, steps, etc. in each embodiment may be added to another embodiment without logical inconsistency, or replace functional parts, means, steps, etc. in another embodiment. In each embodiment, a plurality of functional parts, means, steps, etc. may be combined into one functional part, means, step, etc., and a functional part, means, step, etc. may be divided into a plurality of each functional parts, means, steps, etc. Moreover, each of the disclosed embodiments is not limited to the strict implementation of the embodiment, and features may be combined or partially omitted as appropriate.

The foregoing embodiment is not limited to implementation as the electronic device 1. For example, the foregoing embodiment may be implemented as a control method of a device such as the electronic device 1. For example, the foregoing embodiment may be implemented as a control program of a device such as the electronic device 1.

The electronic device 1 according to the embodiment may include, for example, at least part of only one of the sensor 5 and the controller 10, as a minimum structure. The electronic device 1 according to the embodiment may include at least one of the signal generator 21, the synthesizer 22, the phase controller 23, the amplifier 24, and the transmission antenna 25 illustrated in FIG. 2 as appropriate, in addition to the controller 10. The electronic device 1 according to the embodiment may include at least one of the reception antenna 31, the LNA 32, the mixer 33, the IF unit 34, and the AD converter 35 as appropriate, instead of or together with the foregoing functional parts. Further, the electronic device 1 according to the embodiment may include the memory 40. The electronic device 1 according to the embodiment can thus have any of various structures. In the case where the electronic device 1 according to the embodiment is mounted in the mobile body 100, for example, at least one of the foregoing functional parts may be installed in an appropriate location such as the inside of the mobile body 100. In an embodiment, for example, at least one of the transmission antenna 25 and the reception antenna 31 may be installed on the outside of the mobile body 100.

REFERENCE SIGNS LIST 1 electronic device
5 sensor
10 controller
11 distance FFT processor
12 speed FFT processor
13 arrival angle estimation unit
14 object detector
15 classification processor
16 discontinuity detector
17 frequency selector
20 transmitter
21 signal generator
22 synthesizer
23 phase controller
24 amplifier
25 transmission antenna
30 receiver
31 reception antenna
32 LNA
33 mixer
34 IF unit
35 AD converter
40 memory
50 ECU
100 mobile body
200 object

The invention claimed is:

1. An electronic device comprising:
a transmission antenna configured to transmit transmission waves;
a reception antenna configured to receive reflected waves resulting from reflection of the transmission waves; and
a controller configured to detect an object reflecting the transmission waves, based on a transmission signal transmitted as the transmission waves and a reception signal received as the reflected waves,
wherein the controller is configured to classify a detection result of the object reflecting the transmission waves depending on a degree of certainty, and output the classified detection result,
wherein the controller is configured to classify the detection result as a detection result that the object reflecting the transmission waves is detected but an incidence angle when receiving the reflected waves is unable to be determined, in the case where an intensity of the reflected waves resulting from the reflection of the transmission waves off the object is greater than or equal to a predetermined value and the incidence angle is possibly wrongly estimated, and
wherein the controller is configured to determine that the incidence angle when receiving the reflected waves is possibly wrongly estimated, in the case where information representing the detected object does not continuously change with time.

2. The electronic device according to claim 1, wherein the controller is configured to output information obtained by classifying, in stages, the detection result of the object reflecting the transmission waves depending on the degree of certainty of the detection.

3. The electronic device according to claim 1, wherein the controller is configured to classify the detection result as a detection result that the object reflecting the transmission waves is detected, in the case where an intensity of the reflected waves resulting from the reflection of the transmission waves off the object is greater than or equal to a predetermined value.

4. The electronic device according to claim 1, wherein the controller is configured to classify the detection result as a detection result that the object reflecting the transmission waves is not detected, in the case where an intensity of the reflected waves resulting from the reflection of the transmission waves off the object is less than a predetermined value.

5. The electronic device according to claim 1, wherein the controller is configured to classify the detection result as the detection result that the object reflecting the transmission waves is detected but the incidence angle when receiving the reflected waves is unable to be determined, in the case where the incidence angle is possibly estimated in an inverted state.

6. The electronic device according to claim 1, wherein the controller is configured to correct a frequency of the transmission waves, in the case where the controller determines that the incidence angle when receiving the reflected waves is possibly wrongly estimated.

7. The electronic device according to claim 6, wherein the controller is configured to correct the frequency of the transmission waves to be less than or equal to a predetermined frequency in a predetermined frequency band, in the case where the controller determines that the incidence angle when receiving the reflected waves is possibly wrongly estimated.

8. The electronic device according to claim 1, wherein the incidence angle is an angle between a straight line corresponding to a direction in which the reflected waves are incident on the reception antenna and a perpendicular line to a direction in which a plurality of reception antennas in the reception antenna are arranged.

9. The electronic device according to claim 1, comprising a display configured to display information output from the controller and obtained by classifying the detection result of the object reflecting the transmission waves depending on the degree of certainty.

10. The electronic device according to claim 1, wherein the controller is configured to supply information output from the controller and obtained by classifying the detection result of the object reflecting the transmission waves depending on the degree of certainty, to a controller in a mobile body to which the electronic device is connected.

11. A control method of an electronic device, comprising:
transmitting transmission waves from a transmission antenna;
receiving reflected waves resulting from reflection of the transmission waves, by a plurality of reception antennas;
detecting an object reflecting the transmission waves, based on a transmission signal transmitted as the transmission waves and a reception signal received as the reflected waves; and
classifying a detection result of the object reflecting the transmission waves depending on a degree of certainty, and outputting the classified detection result,
wherein the control method classifies the detection result as a detection result that the object reflecting the transmission waves is detected but an incidence angle when receiving the reflected waves is unable to be determined, based on an intensity of the reflected waves resulting from the reflection of the transmission waves off the object being greater than or equal to a predetermined value and the incidence angle being possibly wrongly estimated, and
wherein the control method determines that the incidence angle when receiving the reflected waves is possibly wrongly estimated, based on information representing the detected object not continuously changing with time.

12. A non-transitory computer-readable recording medium storing computer program instructions, which when executed by an electronic device, cause a computer to:
transmit transmission waves from a transmission antenna;
receive reflected waves resulting from reflection of the transmission waves, by a plurality of reception antennas;
detect an object reflecting the transmission waves, based on a transmission signal transmitted as the transmission waves and a reception signal received as the reflected waves; and
classify a detection result of the object reflecting the transmission waves depending on a degree of certainty, and outputting the classified detection result,
wherein the computer classifies the detection result as a detection result that the object reflecting the transmission waves is detected but an incidence angle when receiving the reflected waves is unable to be determined, in the case where an intensity of the reflected waves resulting from the reflection of the transmission waves off the object is greater than or equal to a predetermined value and the incidence angle is possibly wrongly estimated, and
wherein the computer determines that the incidence angle when receiving the reflected waves is possibly wrongly estimated, in the case where information representing the detected object does not continuously change with time.

* * * * *